(12) United States Patent
Li et al.

(10) Patent No.: US 8,540,059 B2
(45) Date of Patent: Sep. 24, 2013

(54) STROLLER AND BRAKE MECHANISM THEREOF

(75) Inventors: Fang-Ming Li, Central (HK); Hai-Bo Zeng, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 573 days.

(21) Appl. No.: 12/779,060

(22) Filed: May 13, 2010

(65) Prior Publication Data

US 2010/0308553 A1    Dec. 9, 2010

Related U.S. Application Data

(60) Provisional application No. 61/183,975, filed on Jun. 4, 2009.

(30) Foreign Application Priority Data

Dec. 9, 2009   (CN) .......................... 2009 1 0225198

(51) Int. Cl.
   *B62B 9/08*   (2006.01)
   *F16D 65/14*   (2006.01)

(52) U.S. Cl.
   USPC .............. 188/20; 188/69; 188/73.1; 188/1.12

(58) Field of Classification Search
   USPC ................. 188/19, 20, 31, 69, 2 D, 2 F, 1.12, 188/73.1; 280/647–650, 47.38, 33.994, 642, 280/643
   See application file for complete search history.

(56) References Cited

U.S. PATENT DOCUMENTS

| 6,308,805 | B1 * | 10/2001 | Lan ................................. 188/20 |
| 7,059,452 | B2 | 6/2006 | Chen |
| 7,367,432 | B2 * | 5/2008 | Chen .............................. 188/19 |
| 2004/0178025 | A1 | 9/2004 | Zweideck |

FOREIGN PATENT DOCUMENTS

| CN | 2774884 Y | 4/2006 |
| CN | 2895186 Y | 5/2007 |
| CN | 201154728 Y | 11/2008 |
| CN | 201161529 Y | 12/2008 |
| CN | 201186669 Y | 1/2009 |
| EP | 1 447 301 A2 | 8/2004 |
| JP | S6018406 A | 1/1985 |
| JP | S60240566 A | 11/1985 |
| JP | S61135858 A | 6/1986 |
| JP | 200514894 A | 1/2005 |
| JP | 2005313796 A | 11/2005 |
| JP | 200783966 A | 4/2007 |

* cited by examiner

*Primary Examiner* — Melody Burch
(74) *Attorney, Agent, or Firm* — Winston Hsu; Scott Margo

(57) ABSTRACT

A brake mechanism includes a first wheel base, a second wheel base, a linkage part, a passive brake device and an active brake device. The first wheel base and the second wheel base are installed on two feet of a stroller, respectively. A first wheel set and a second wheel set of the stroller are pivotally connected to the first wheel base and the second wheel base, respectively. The passive brake device and the active brake device are connected to a first end and a second end of the linkage part, respectively. The active brake device includes a first engaging part and a driving part. The driving part is rotatably disposed on the second wheel base. When the driving part rotates between a locking position and a releasing position, the driving part drives the first engaging part and drives the passive brake device to move via the linkage part.

8 Claims, 32 Drawing Sheets

STROLLER AND BRAKE MECHANISM THEREOF

CROSS REFERENCE TO RELATED APPLICATIONS

This application claims the benefit of U.S. Provisional Application No. 61/183,975, which was filed on Jun. 4, 2009 and is incorporated herein by reference.

BACKGROUND OF THE INVENTION

1. Field of the Invention

The present invention relates to a stroller and a related brake mechanism, and more specifically, to a stroller capable of braking two wheels simultaneously and a related brake mechanism.

2. Description of the Prior Art

A conventional brake mechanism for a stroller involves utilizing a tooth structure of a brake pedal to be engaged with a hole on a rear wheel hub. However, since the brake mechanism is only used for braking one corresponding wheel, a user is usually incapable of braking two rear wheels of the stroller simultaneously and quickly in an emergency situation. Thus, turnover or slipping of the stroller may occur accordingly so as to endanger the baby in the seat, especially when the user pushes the stroller to move forward at a high speed or on a rough road. Furthermore, in some countries, brake linkage designs have been legislated into safety regulations for design of a stroller to ensure safety of the baby sitting therein.

Thus, how to design a brake mechanism for a stroller, which is easy to operate, has a high brake performance, and is capable of braking two wheels simultaneously, is a concern in the structural design of the stroller.

SUMMARY OF THE INVENTION

The present invention provides a brake mechanism for a stroller, the stroller comprising two feet disposed at two sides of the stroller respectively, a first wheel set, and a second wheel set, the brake mechanism comprising a first wheel base and a second wheel base installed on the two feet respectively, the first wheel set and the second wheel set being pivotally connected to the first wheel base and the second wheel base respectively; a linkage part having a first end and a second end; a passive brake device movably connected to the first wheel base and connected to the first end of the linkage part; and an active brake device disposed on the second wheel base and connected to the second end of the linkage part, the active brake device comprising a first engaging part movably disposed on the second wheel base; and a driving part connected to the first engaging part and rotatably disposed on the second wheel base, the driving part being used for driving the first engaging part so as to move the passive brake device relative to the first wheel base via the linkage part when the driving part rotates between a locking position and a releasing position relative to the second wheel base; wherein when the driving part is located at the locking position, the passive brake device and the first engaging part of the active brake device may constrain rotation of the first wheel set and the second wheel set, respectively.

The present invention further provides a stroller comprising a stroller body; two feet disposed at two sides of the stroller body, respectively; a first wheel set and a second wheel set; and a brake mechanism comprising a first wheel base and a second wheel base installed on the two feet, respectively, the first wheel set and the second wheel set being pivotally connected to the first wheel base and the second wheel base, respectively; a linkage part having a first end and a second end; a passive brake device movably connected to the first wheel base and connected to the first end of the linkage part; and an active brake device disposed on the second wheel base and connected to the second end of the linkage part, the active brake device comprising a first engaging part movably disposed on the second wheel base; and a driving part connected to the first engaging part and rotatably disposed on the second wheel base, the driving part being used for driving the first engaging part so as to move the passive brake device relative to the first wheel base via the linkage part when the driving part rotates between a locking position and a releasing position relative to the second wheel base; wherein when the driving part is located at the locking position, the passive brake device and the first engaging part of the active brake device may constrain rotation of the first wheel set and the second wheel set, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
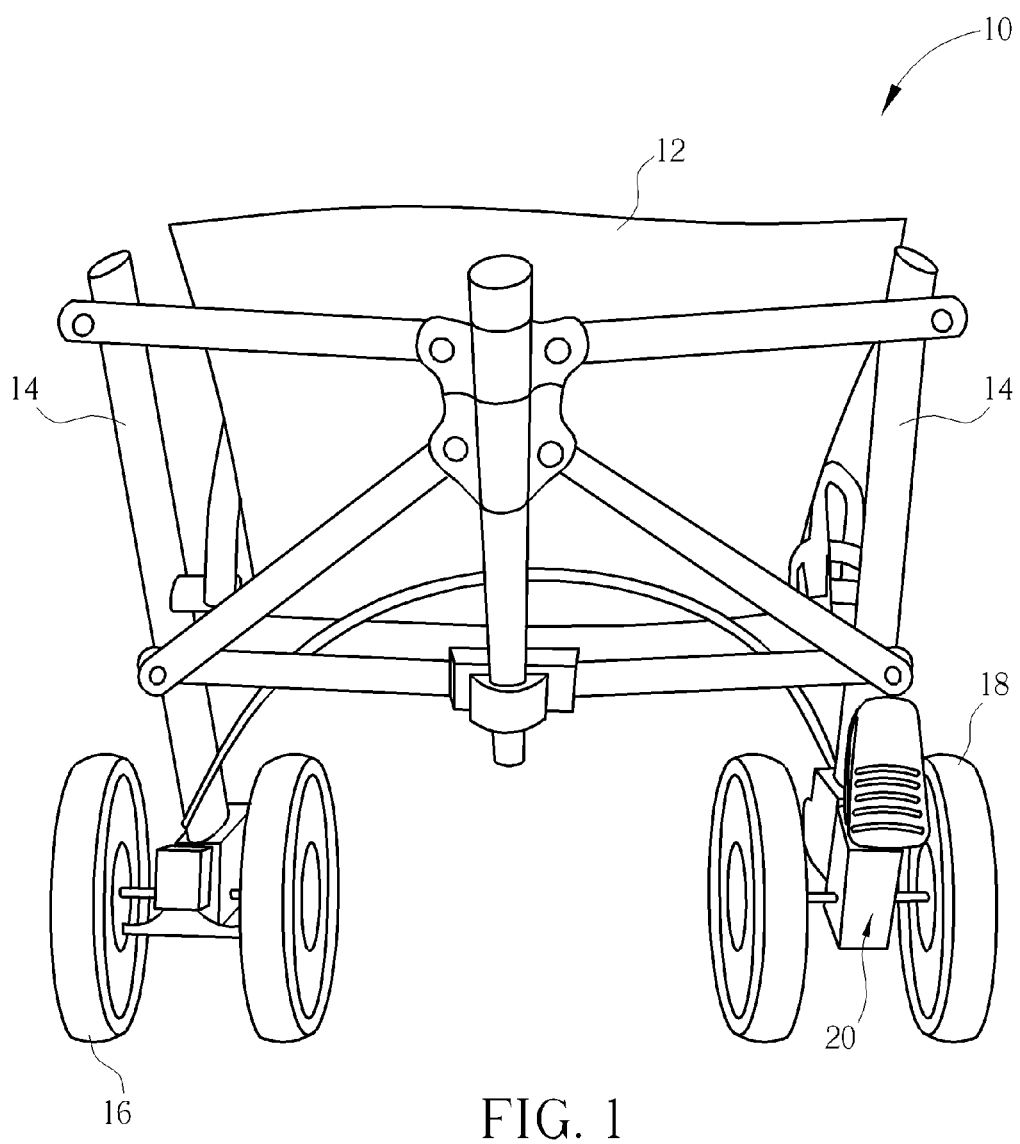
FIG. 1 is a partial diagram of a stroller according to a first embodiment of the present invention.
Figure 2:
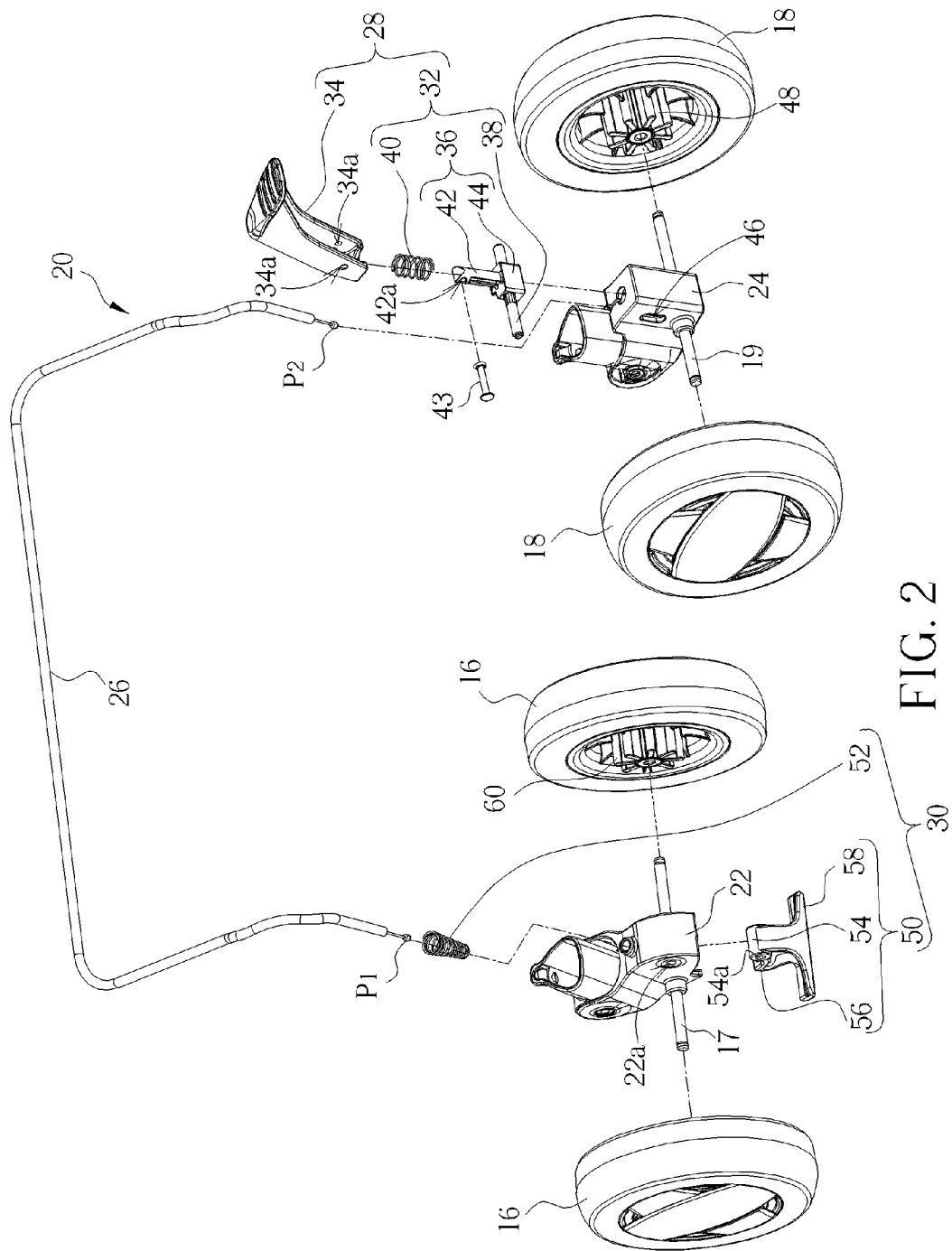
FIG. 2 is an exploded diagram of a first wheel set, a second wheel set, and a brake mechanism in FIG. 1.

Please refer to FIG. 1, which is a partial diagram of a stroller 10 according to a first embodiment of the present invention. The stroller 10 includes a stroller body 12, two feet 14, a first wheel set 16, a second wheel set 18, and a brake mechanism 20. As shown in FIG. 1, the two feet 14 are disposed at two sides of the stroller body 12, respectively. Next, please refer to FIG. 2, which is an exploded diagram of the first wheel set 16, the second wheel set 18, and the brake mechanism 20 in FIG. 1. As shown in FIG. 2, the brake mechanism 20 includes a first wheel base 22, a second wheel base 24, a linkage part 26, an active brake device 28, and a passive brake device 30.

More detailed description for the structural designs of the said components is provided as follows. The first wheel base 22 and the second wheel base 24 are installed on the two feet 14 as shown in FIG. 1, respectively. The first wheel set 16 and the second wheel set 18 in FIG. 1 are pivotally connected to the first wheel base 22 and the second wheel base 24 via shafts 17 and 19, respectively. A first end $P_1$ and a second end $P_2$ of the linkage part 26 are disposed through the first wheel base 22 and the second wheel base 24, respectively, and the first end $P_1$ is engaged with a connecting portion 56 of a second engaging part 50 on the passive brake device 30 after passing through the first wheel base 22. The active brake device 28 is disposed on the second wheel base 24 and is connected to the second end $P_2$ of the linkage part 26. The active brake device 28 includes a first engaging part 32 and a driving part 34.

The first engaging part 32 is used for engaging with the second wheel set 18. The first engaging part 32 includes a sliding block 36, an engaging rod 38, and a first spring 40. A sliding shaft 42 of the sliding block 36 is disposed through the second wheel base 24 and is pivotally connected to the driving part 34 by utilizing a pivot part 43 in FIG. 2 to pass through its pivot hole 42a and a pivot hole 34a of the driving part 34, so that the driving part 34 can be rotatably disposed on the second wheel base 24. The engaging rod 38 passes through a base 44 of the sliding block 36 and is disposed through a slot hole 46 of the second wheel base 24, wherein the engaging rod 38 is assembled to the base 44 in an interference-fit manner. The second end $P_2$ of the linkage part 26 is connected to the base 44 after passing through the second wheel base 24. The first spring 40 is preferably used for enveloping the sliding shaft 42 and abutting against the base 44 and the second wheel base 24 in a compressed state so as to position the driving part 34 on the second wheel base 24. In such a manner, the said first spring 40, which is in the compressed state, can push the base 44 of the sliding block 36 when the driving part 34 rotates relative to the second wheel base 24, so as to pull the second end $P_2$ of the linkage part 26. Thus, the engaging rod 38 can be pulled accordingly along the slot hole 46 of the second wheel base 24 to be engaged with a hub 48 of the second wheel set 18.

The passive brake device 30 includes a second engaging part 50 and a second spring 52. The second engaging part 50 is pivotally connected to the first wheel base 22 by utilizing a connecting rod (not shown in FIG. 2) to pass through a pivot hole 54a on its pivot portion 54 and a pivot hole 22a of the first wheel base 22. The first end $P_1$ is connected to a connecting portion 56 of the second engaging part 50 after passing through the first wheel base 22. The second spring 52 is used for enveloping the first end $P_1$ and abutting against the first wheel base 22 and the connecting portion 56.

Figure 3:
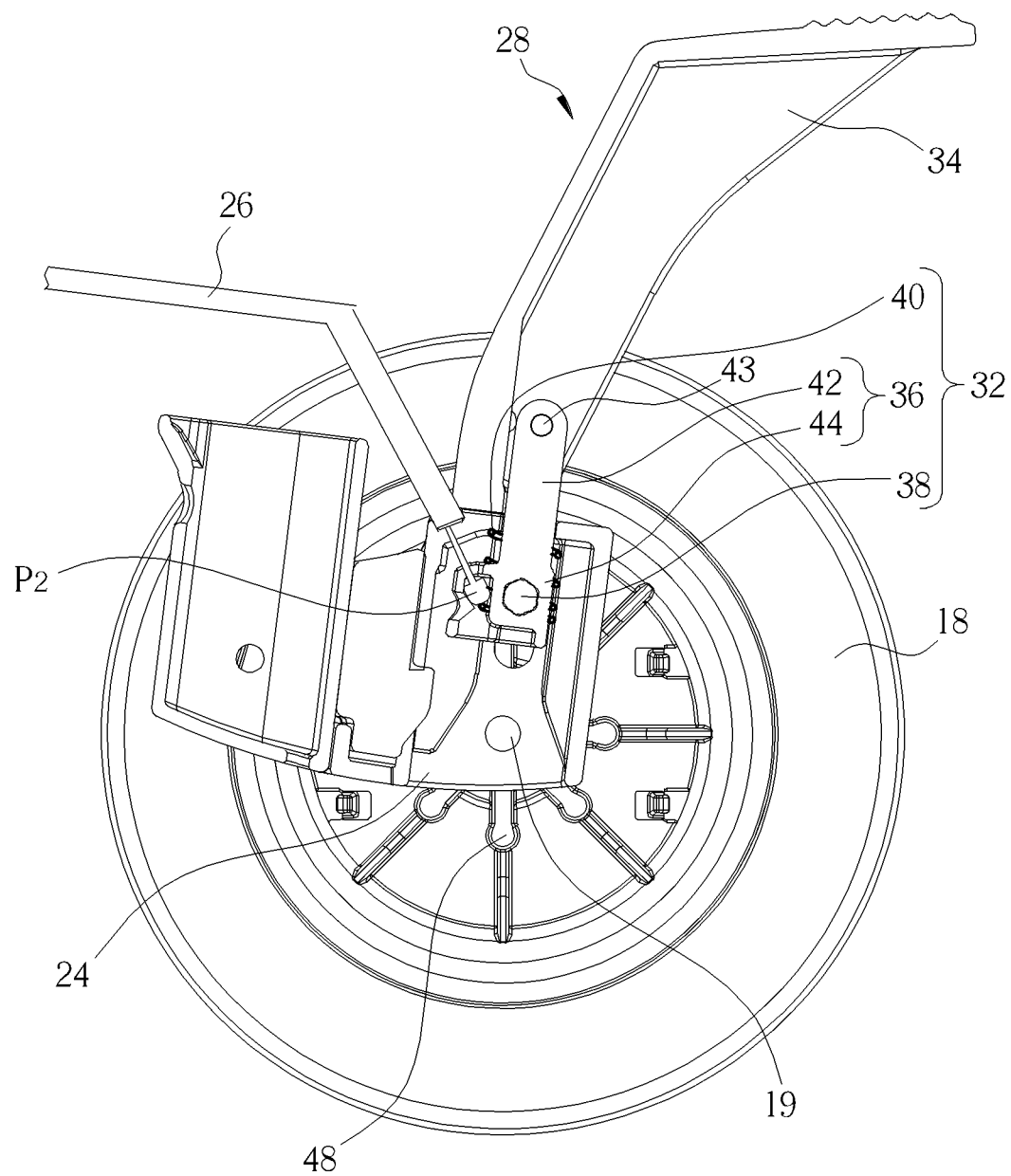
FIG. 3 is an interior diagram of a second wheel base and an active brake device in FIG. 2 when a driving part is located at a releasing position.
Figure 4:
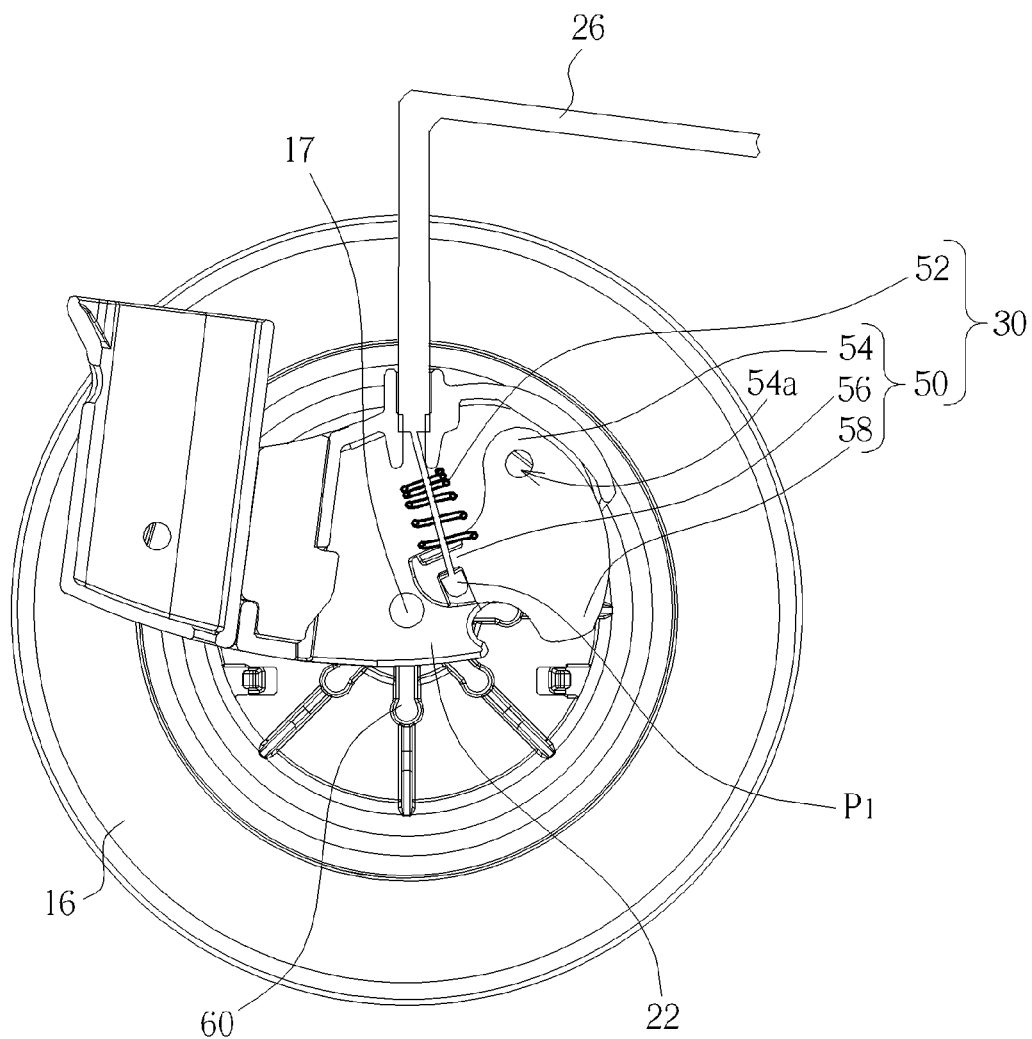
FIG. 4 is an interior diagram of a first wheel base and a passive brake device in FIG. 2 when the driving part is located at the releasing position.

In the following, linkage of the linkage part 26, the active brake device 28, and the passive brake device 30 is described in detail. Please refer to FIG. 3 and FIG. 4. FIG. 3 is an interior diagram of the second wheel base 24 and the active brake device 28 in FIG. 2 when the driving part 34 is located at a releasing position. FIG. 4 is an interior diagram of the first wheel base 22 and the passive brake device 30 in FIG. 2 when the driving part 34 is located at the releasing position. When the driving part 34 takes the pivot part 43 as a pivot point to rotate to the releasing position relative to the second wheel base 24, a position of the first engaging part 32 relative to the second end $P_2$ of the linkage part 26 and the second wheel base 24 is as shown in FIG. 3, and the engaging rod 38 and the hub 48 of the second wheel set 18 are separate from each other. Thus, the second wheel set 18 is capable of rotating relative to the second wheel base 24. At this time, since the driving part 34 may drive the sliding shaft 42 to move upward relative to the second wheel base 24, the first spring 40 abutting against the second wheel base 24 and the base 44 is compressed accordingly. In such a manner, the first spring 40 can provide downward elastic force to the sliding block 36 so that the driving part 34 connected to the sliding block 36 can be positioned at the releasing position steadily.

Simultaneously, a position of the second engaging part 50 relative to the first end $P_1$ of the linkage part 26 and the first wheel base 22 is as shown in FIG. 4. Since the first end $P_1$ is elongated when the driving part 34 is located at the releasing position, the distance between the second end $P_2$ of the linkage part 26 and the upper housing of the second wheel base 24 may be shortened accordingly. Thus, the engaging portion 58 of the second engaging part 50 may take the pivot portion 54 as a pivot point to rotate counterclockwise relative to the first wheel base 22 by elastic force provided from the compressed second spring 52, so as to make the engaging portion 58 separate from the hub 60 of the first wheel set 16 (at this time, the second spring 52 is still compressed). That is, when the driving part 34 is located at the releasing position as shown in FIG. 3, the first wheel set 16 and the second wheel set 18 may rotate relative to the first wheel base 22 and the second wheel base 24, respectively, so that a user can push the stroller 10 to move forward easily.

Figure 5:
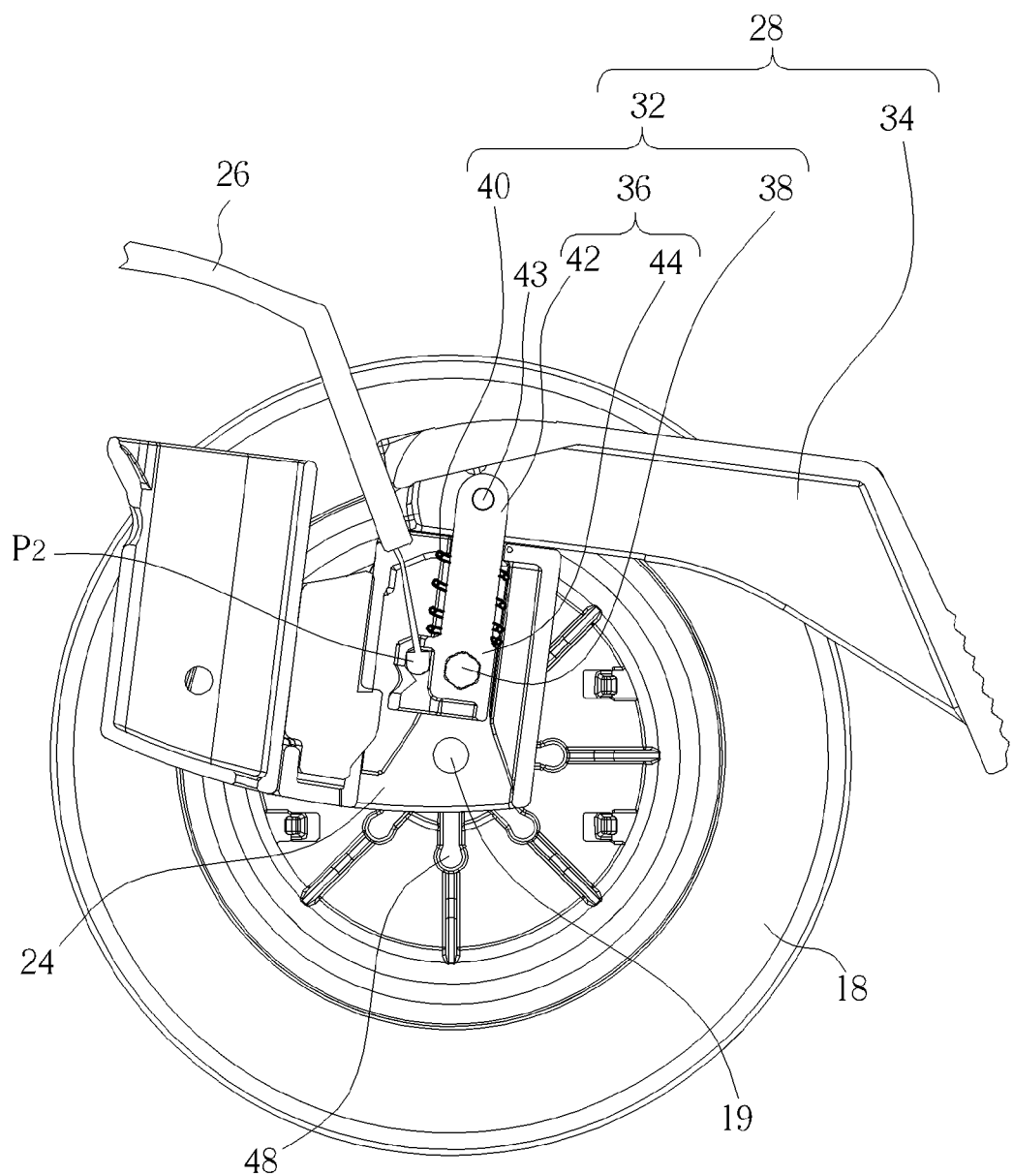
FIG. 5 is an interior diagram of the second wheel base and the active brake device in FIG. 3 when the driving part is located at a locking position.
Figure 6:
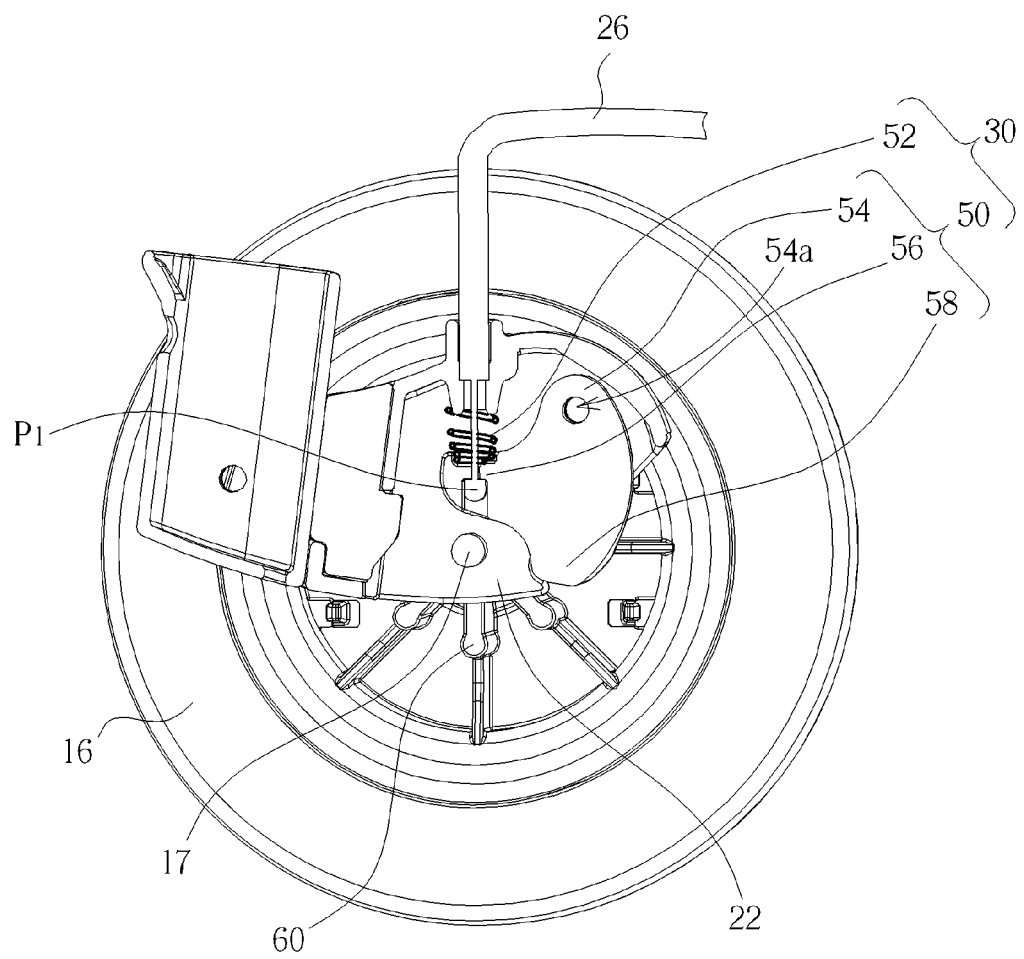
FIG. 6 is an interior diagram of the passive brake device and the first wheel base in FIG. 4 when the driving part is located at the locking position.

Next, please refer to FIG. 5 and FIG. 6. FIG. 5 is an interior diagram of the second wheel base 24 and the active brake device 28 in FIG. 3 when the driving part 34 is located at a locking position. FIG. 6 is an interior diagram of the passive brake device 30 and the first wheel base 22 in FIG. 4 when the driving part 34 is located at the locking position. If the user wants to operate the active brake device 28 to brake the stroller 10, the user just needs to push the driving part 34 (e.g. treading the driving part 34) to rotate from the releasing position as shown in FIG. 3 to the locking position as shown in FIG. 5 relative to the second wheel base 24. Thus, the sliding block 36 can move downward accordingly with rotation of the driving part 34 to pull the second end $P_2$ of the linkage part 26 as shown in FIG. 5, and move the engaging rod 38 downward along the slot hole 46 in FIG. 2 of the second wheel base 24 to be engaged with the hub 48 of the second wheel set 18. In such a manner, the second wheel set 18 is incapable of rotating relative to the second wheel base 24. At this time, as mentioned above, the first spring 40 is still compressed so that the driving part 34 can be positioned at the locking position steadily by downward elastic force provided from the first spring 40.

On the other hand, since the second end $P_2$ of the linkage part 26 is pulled to the position as shown in FIG. 5 by the sliding block 36, the first end $P_1$ of the linkage part 26 may be pulled upward accordingly so as to drive the second engaging part 50 to rotate from a position as shown in FIG. 4 to a position as shown in FIG. 6 relative to the first wheel base 22. At this time, the compressed second spring 52 can drive the engaging portion 58 of the second engaging part 50 to be engaged with the hub 60 of the first wheel set 16, so as to make the first wheel set 16 incapable of rotating relative to the first wheel base 22. In brief, when the user pushes the driving part 34 to rotate to the locking position as shown in FIG. 5, the stroller 10 can constrain rotation of the first wheel set 16 and the second wheel set 18 relative to the first wheel base 22 and the second wheel base 24, respectively, via linkage of the active brake device 28, the linkage part 26, and the passive brake device 30, so as to achieve the purpose of braking the first wheel set 16 and the second wheel set 18 simultaneously.

If the user wants to release the first engaging part 32 and the second engaging part 50, the user just needs to push the driving part 34 from the locking position as shown in FIG. 5 to the releasing position as shown in FIG. 3. Simultaneously, the engaging rod 38 may move upward along the slot hole 46 of the second wheel base 24 with rotation of the driving part 34 so as to be separate from the hub 48 of the second wheel set 18. At this time, since the second end $P_2$ of the linkage part 26 is no longer pulled by the sliding block 36, the compressed second spring 52 may provide elastic force to the connecting portion 56 of the second engaging part 50 so that the second engaging part 50 can rotate from the position as shown in FIG. 6 back to the position as shown in FIG. 4 relative to the first wheel base 22. Thus, the engaging portion 58 of the second engaging part 50 can be separate from the hub 60 of the first wheel set 16. In such a manner, the first wheel set 16 and the second wheel set 18 can rotate relative to the first wheel base 22 and the second wheel base 24, respectively, so that the user can push the stroller 10 to move forward easily.

Furthermore, no matter the driving part 34 is located at the locking position or the releasing position, the compressed second spring 52 can always provide elastic force to the driving part 34 via the linkage part 26 for positioning the driving part 34 on the second wheel base 24.

Figure 7:
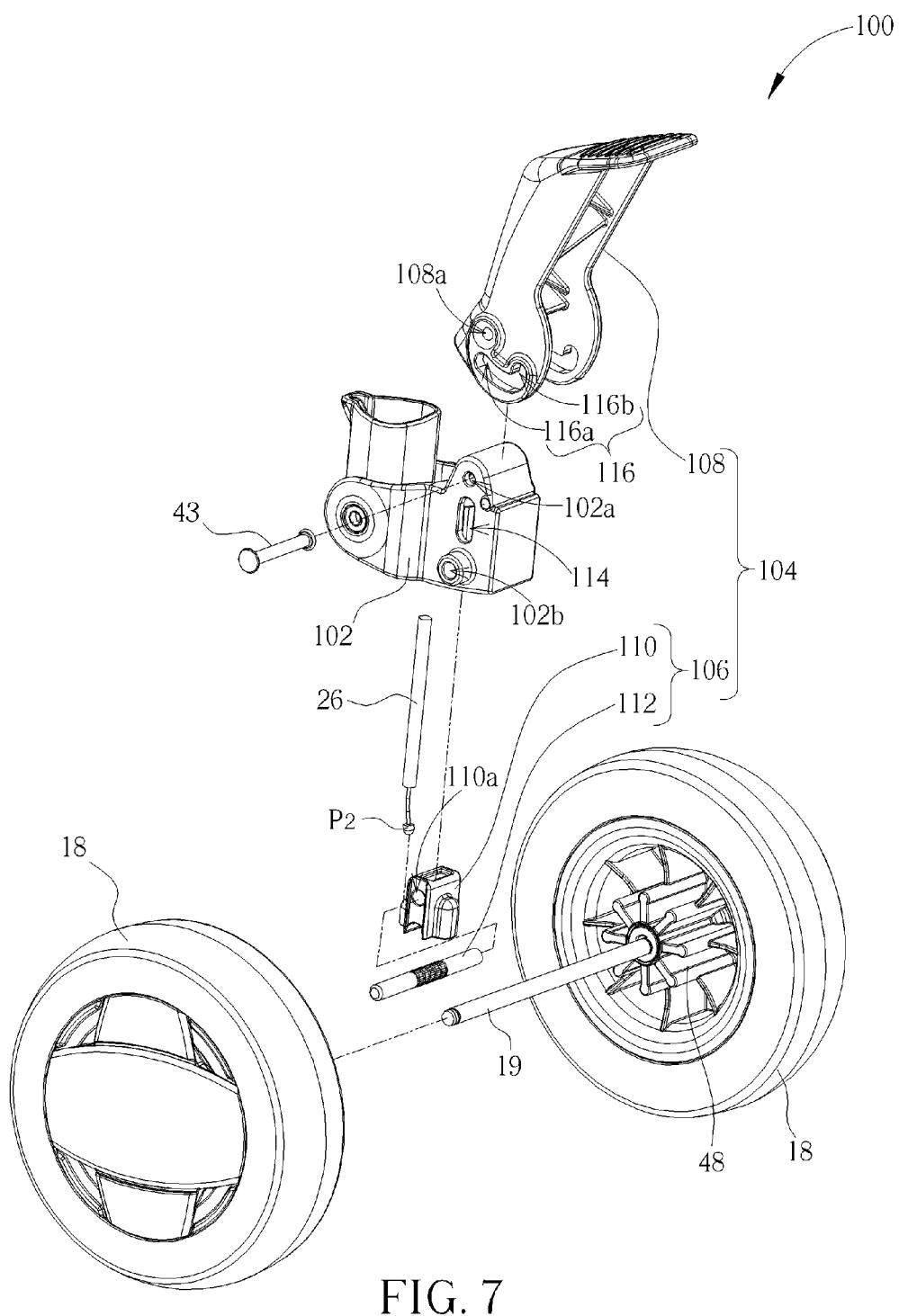
FIG. 7 is a partial exploded diagram of a brake mechanism and the second wheel set according to a second embodiment of the present invention.

Next, please refer to FIG. 7, which is a partial exploded diagram of a brake mechanism 100 and the second wheel set 18 according to a second embodiment of the present invention. Components both mentioned in the first embodiment and the second embodiment represent components with similar functions or structures. That is, components located at the passive side of the brake mechanism 100 are the same as those located at the brake mechanism 20 in the first embodiment, such as the first wheel base 22 and the passive brake device 30, and the related description is therefore omitted herein for simplicity. The major difference between the brake mechanism 100 and the brake mechanism 20 is the structural design of the active brake device and the omission of the first spring.

As shown in FIG. 7, the brake mechanism 100 includes the linkage part 26 (only shown partially in FIG. 7), a second wheel base 102 and an active brake device 104. The active brake device 104 includes a first engaging part 106 and a driving part 108. The first engaging part 106 is used for engaging with the hub 48 of the second wheel set 18. The first engaging part 106 includes a sliding block 110 and an engaging rod 112. The second end $P_2$ of the linkage part 26 is connected to the sliding block 110 after passing through the second wheel base 102. The engaging rod 112 passes through a pivot hole 110a of the sliding block 110 and is disposed through a slot hole 114 of the second wheel base 102 and a guide slot 116 of the driving part 108. The driving part 108 is pivotally connected to the second wheel base 102 by utilizing the pivot part 43 to pass through its pivot hole 108a and a pivot hole 102a of the second wheel base 102. The second wheel set 18 is pivotally connected to the second wheel base 102 by utilizing the shaft 19 to pass through a pivot hole 102b of the second wheel base 102.

Furthermore, in this embodiment, the second spring 52 as shown in FIG. 2 may also abut against the first wheel base 22 and the connecting portion 56 of the second engaging part 50 in a compressed state. Thus, the compressed second spring 52 can always provide elastic force to the driving part 108 via the linkage part 26 so as to position the driving part 108 on the second wheel base 102. The related description is omitted herein since it is the same as that mentioned in the first embodiment.

Figure 8:
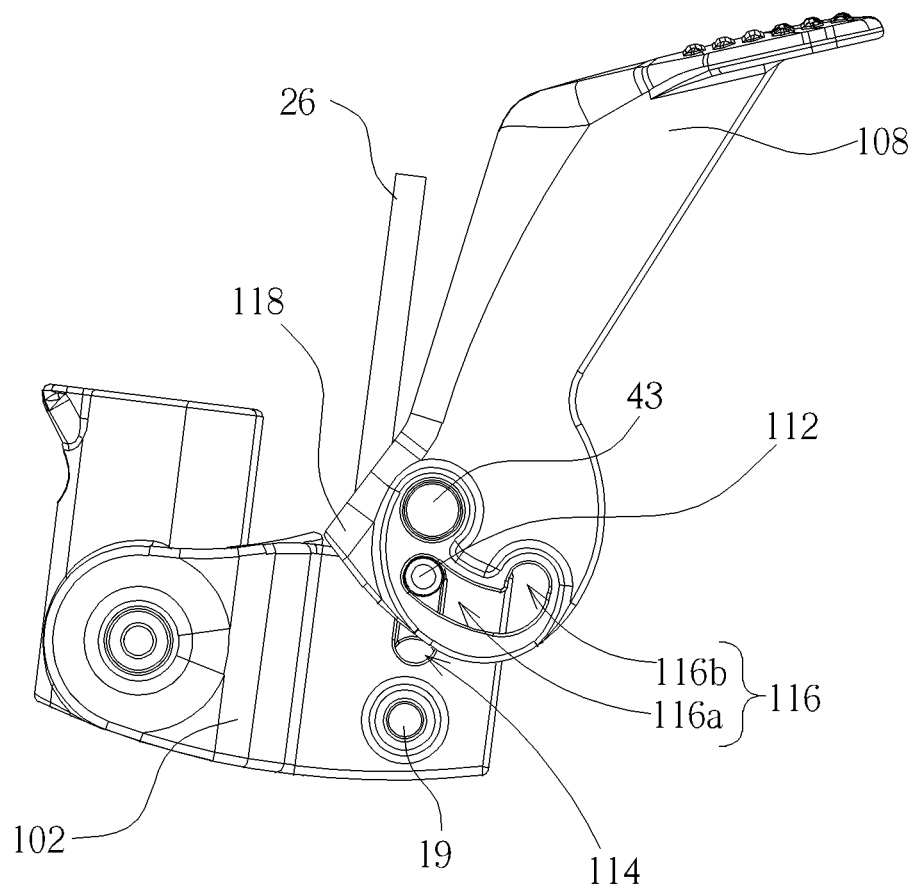
FIG. 8 is a diagram of a driving part in FIG. 7 being located at a releasing position.
Figure 9:
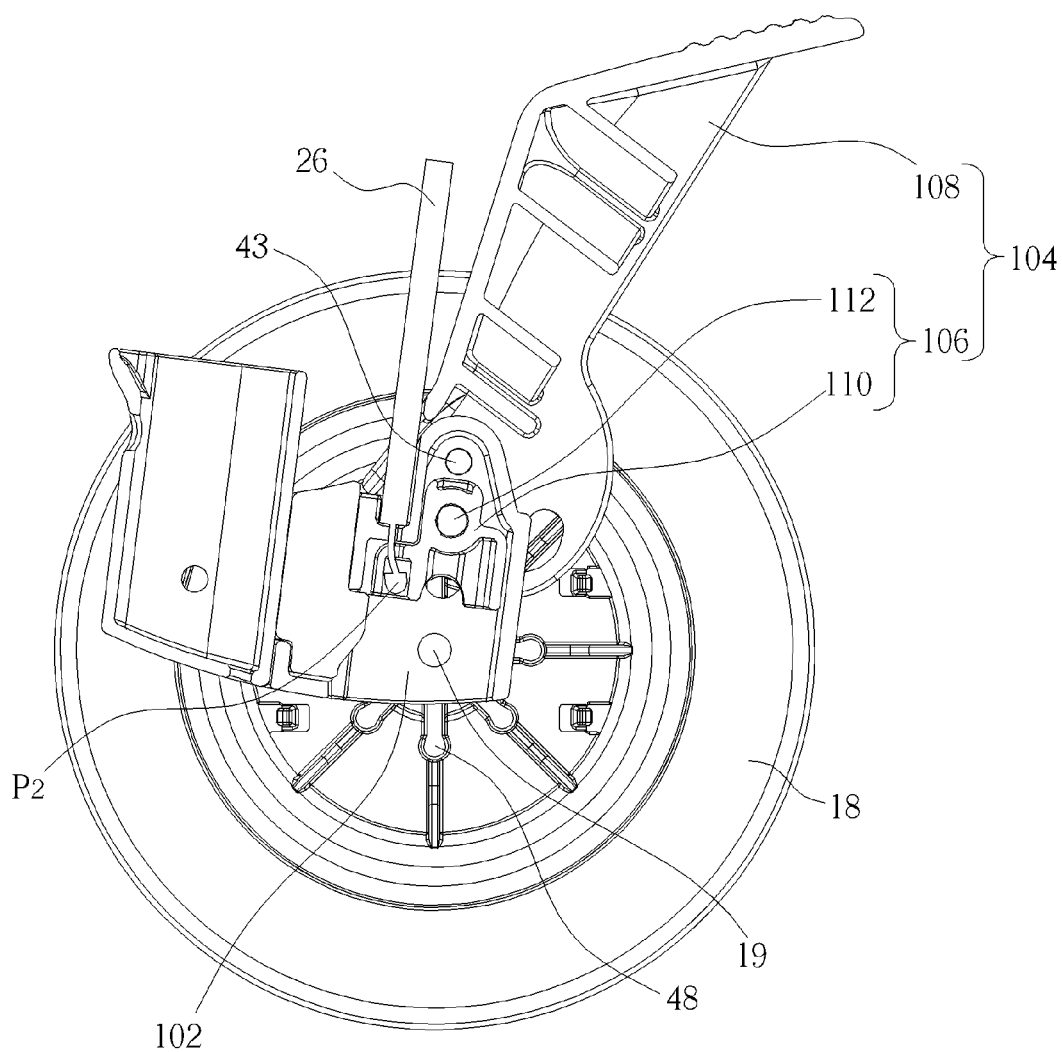
FIG. 9 is an interior diagram of an active brake device and a second wheel base in FIG. 8 when the driving part is located at the releasing position.

More detailed description for linkage of the active brake device 104, the linkage part 26 and the passive brake device 30 is provided as follows. Please refer to FIG. 8 and FIG. 9. FIG. 8 is a diagram of the driving part 108 in FIG. 7 being located at the releasing position. FIG. 9 is an interior diagram of the active brake device 104 and the second wheel base 102 in FIG. 8 when the driving part 108 is located at the releasing position. When the driving part 108 rotates to the releasing position as shown in FIG. 8 relative to the second wheel base 102, the position of the first engaging part 106 relative to the second end $P_2$ of the linkage part 26 and the second wheel base 102 is as shown in FIG. 9, and the engaging rod 112 and the hub 48 of the second wheel set 18 are separate from each other. That is, the second wheel set 18 is capable of rotating relative to the second wheel base 102. At this time, the compressed second spring 52 can provide elastic force to the linkage part 26 so as to make the second end $P_2$ of the linkage part 26 pull the sliding block 110 of the first engaging part 106 tightly. Thus, the engaging rod 112 can abut against the top end of the guide slot 116 of the driving part 108 tightly (as shown in FIG. 8). In such a manner, the driving part 108 can be positioned at the releasing position as shown in FIG. 8 steadily. At the same time, as shown in FIG. 4, the engaging portion 58 of the second engaging part 50 and the hub 60 of the first wheel set 16 are also separate from each other, so as to make the first wheel set 16 capable of rotating relative to the first wheel base 22.

Figure 10:
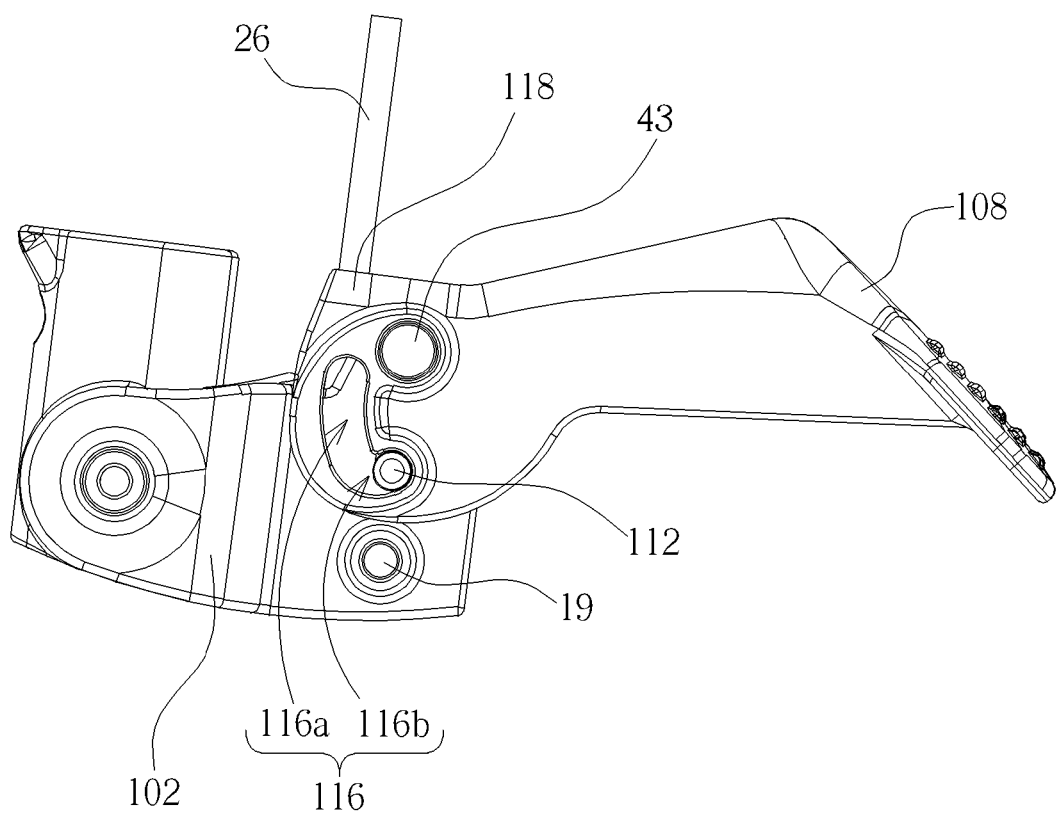
FIG. 10 is a diagram of the driving part in FIG. 8 rotating to a locking position relative to the second wheel base.
Figure 11:
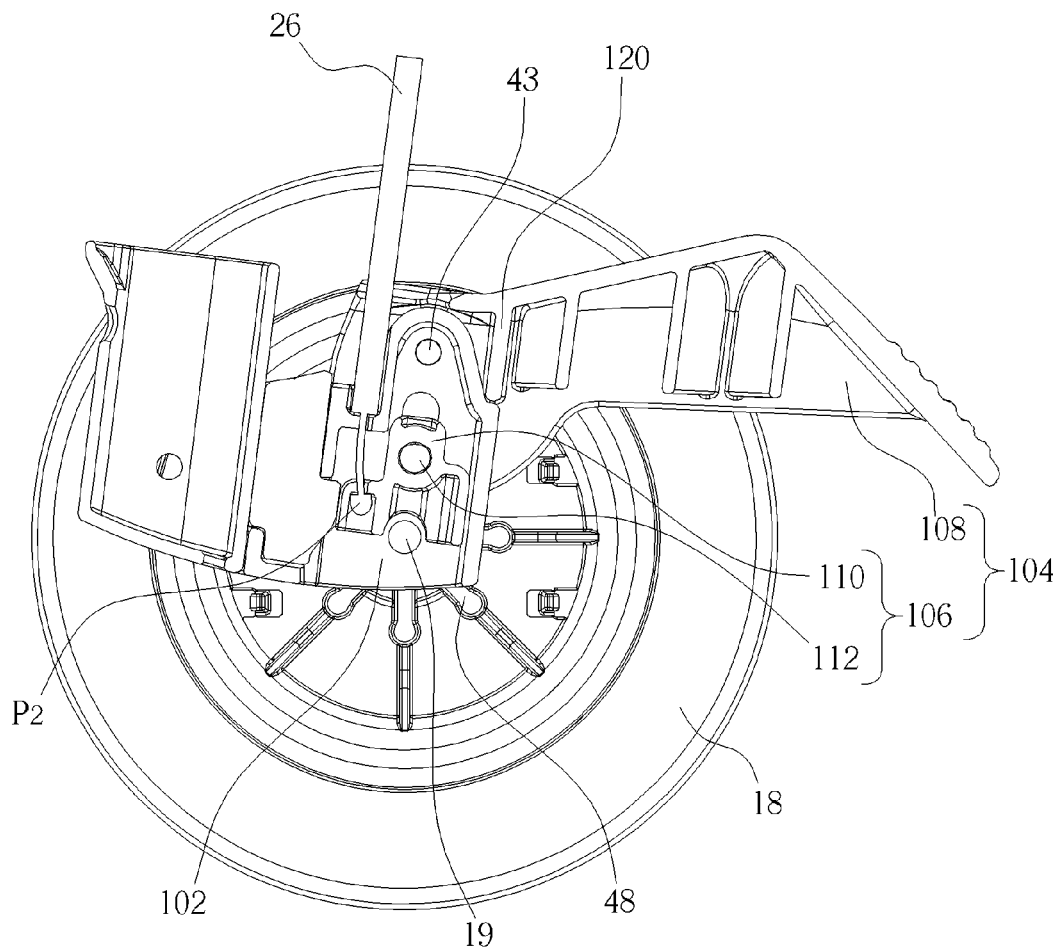
FIG. 11 is an interior diagram of the active brake device and the second wheel base in FIG. 8 when the driving part is located at the locking position.

Next, please refer to FIG. 10 and FIG. 11. FIG. 10 is a diagram of the driving part 108 in FIG. 8 rotating to the locking position relative to the second wheel base 102. FIG. 11 is an interior diagram of the active brake device 104 and the second wheel base 102 in FIG. 8 when the driving part 108 is located at the locking position. If the user wants to operate the active brake device 104 to brake the stroller 10, the user just needs to push the driving part 108 to rotate from the releasing position as shown in FIG. 8 to the locking position as shown in FIG. 10. At this time, with rotation of the driving part 108, a guide portion 116a of the guide slot 116 of the driving part 108 may guide the engaging rod 112 to move along the slot hole 114 so as to be engaged with the hub 48 of the second wheel set 18. Thus, the second wheel set 18 is incapable of rotating relative to the second wheel base 102. Furthermore, the sliding block 110 may simultaneously pull the second end $P_2$ of the linkage part 26 to move to a position as shown in FIG. 11, and then the compressed second spring 52 can provide elastic force to the linkage part 26 so as to make the second end P2 pull the sliding block 110 tightly. In such a manner, the engaging rod 112 can abut against the engaging portion 116b of the guide slot 116 of the driving part 108 tightly (as shown in FIG. 10) so that the driving part 108 can be positioned at the locking position steadily.

On the other hand, since linkage of the passive brake device 30 and the linkage part 26 during the driving part 108 rotates to locking position is the same as that in the first embodiment (as shown in FIG. 4 and FIG. 6), it is therefore omitted herein. In brief, when the user pushes the driving part 108 to rotate to the locking position as shown in FIG. 10, the stroller 10 can constrain rotation of the first wheel set 16 and the second wheel set 18 via linkage of the active brake device 104, the linkage part 26 and the passive brake device 30, so that the purpose of braking the first wheel set 16 and the second wheel set 18 simultaneously can be achieved accordingly.

If the user wants to release engagement of the first engaging part 106 and the second wheel set 18 and engagement of the second engaging part 50 and the first wheel set 16, the user just needs to push the driving part 108 to rotate from the locking position as shown in FIG. 10 to the releasing position as shown in FIG. 8. At this time, the guide slot 116 of the driving part 108 may guide the engaging rod 112 to move upward along the slot hole 114 of the second wheel base 102 with rotation of the driving part 108, so that the engaging rod 112 can be separate from the hub 48 of the second wheel set 18.

At the same time, as mentioned in the first embodiment, the engaging portion 58 of the second engaging part 50 may also be separate from the hub 60 of the first wheel set 16. Thus, the first wheel set 16 and the second wheel set 18 can rotate relative to the first wheel base 22 and the second wheel base 102, respectively, so as to make the user capable of pushing the stroller 10 to move forward easily.

As shown in FIG. 8 and FIG. 11, the driving part 108 of the active brake device 104 further includes limiting portions 118 and 120. The limiting portion 118 is preferably a rib located at the front edge of the driving part 108, and the limiting portion 120 is preferably a rib located inside the driving part 108. Thus, via abutting of the limiting portions 118 and 120 against the second wheel base 102 respectively, the purpose of constraining the rotating range of the driving part 108 can be achieved accordingly.

Figure 12:
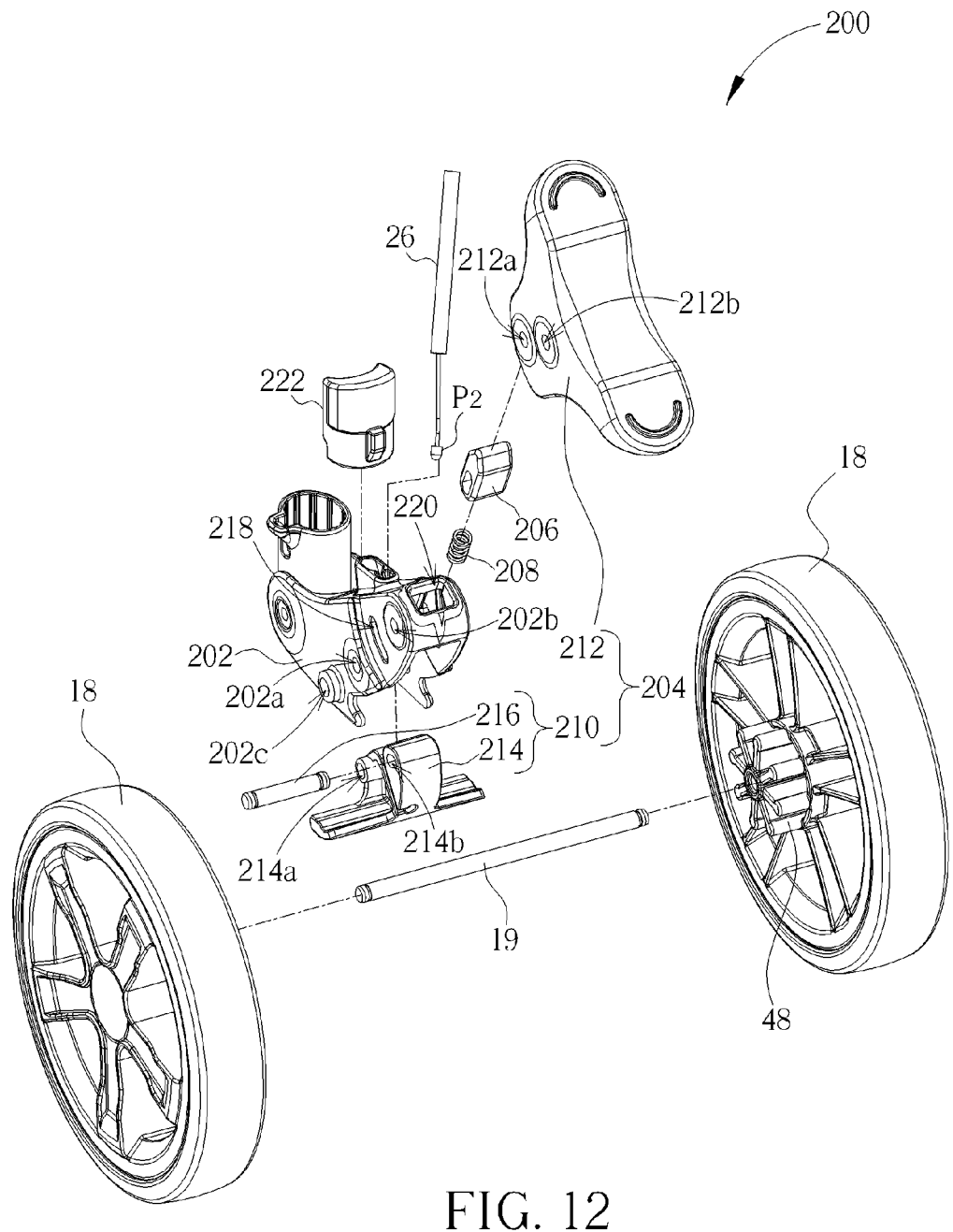
FIG. 12 is a partial exploded diagram of a brake mechanism and the second wheel set according to a third embodiment of the present invention.

Next, please refer to FIG. 12, which is a partial exploded diagram of a brake mechanism 200 and the second wheel set 18 according to a third embodiment of the present invention. Components both mentioned in the first embodiment and the third embodiment represent components with similar functions or structures. That is, components located at the passive side of the brake mechanism 200 are the same as those located at the brake mechanism 20 in the first embodiment, such as the first wheel base 22 and the passive brake device 30, and the related description is therefore omitted herein for simplicity.

The major difference between of the brake mechanism 200 and the brake mechanism 20 is the structural designs of the active brake device and the limiting part. As shown in FIG. 12, the brake mechanism 200 includes the linkage part 26 (only shown partially in FIG. 12), a second wheel base 202, an active brake device 204, a limiting part 206, and a return spring 208. The active brake device 204 includes a first engaging part 210 and a driving part 212.

The first engaging part 210 is used for engaging with the hub 48 of the second wheel set 18. The first engaging part 210 includes an engaging block 214 and a connecting rod 216. The engaging block 214 is connected to the second end $P_2$ of the linkage part 26 and is pivotally connected to the second wheel base 202 by utilizing a connecting rod (not shown in FIG. 12) to pass through its pivot hole 214a and a pivot hole 202a of the second wheel base 202. The connecting rod 216 is disposed through a pivot hole 212a of the driving part 212, a pivot hole 214b of the engaging block 214, and a pivot hole 218 of the second wheel base 202. The driving part 212 is pivotally connected to the second wheel base 202 by utilizing a connecting rod (not shown in FIG. 12) to pass through its pivot hole 212b and a pivot hole 202b of the second wheel base 202, so that the driving part 212 is capable of rotating between a locking position and a releasing position relative to the second wheel base 202. Furthermore, the second wheel set 18 is pivotally connected to the second wheel base 202 by utilizing the shaft 19 to pass through a pivot hole 202c of the second wheel base 202. When the driving part 212 moves toward the locking position, the driving part 212 may drive the connecting rod 216 to move along the slot hole 218, so as to make the engaging block 214 be engaged with the hub 48 of the second wheel set 18 and pull the second end $P_2$ of the linkage part 26 to move downward. The limiting part 206 is movably disposed through an opening 220 of the second wheel base 202. The return spring 208 is disposed inside the limiting part 206 so that the limiting part 206 can be pressed to abut against the driving part 212 by elastic force provided from the return spring 208.

Figure 13:
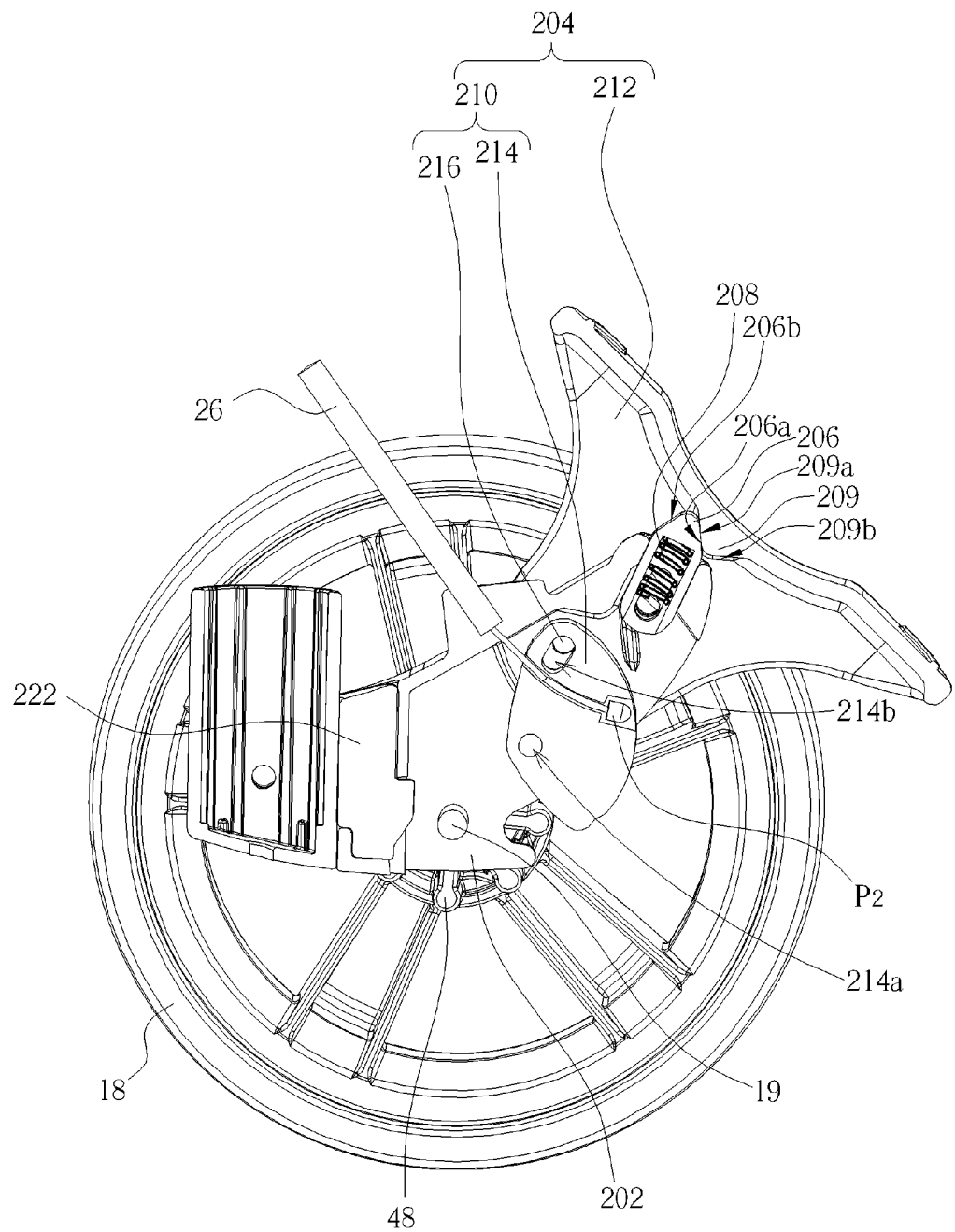
FIG. 13 is an interior diagram of a second wheel base and an active brake device in FIG. 12 when a driving part is located at a releasing position.

More detailed description for linkage of the active brake device 204, the linkage part 26 and the passive brake device 30 is provided as follows. Please refer to FIG. 13, which is an interior diagram of the second wheel base 202 and the active brake device 204 in FIG. 12 when the driving part 212 is located at the releasing position. When the driving part 212 rotates to the releasing position as shown in FIG. 13 relative to the second wheel base 202, a position of the first engaging part 210 relative to the second end $P_2$ of the linkage part 26 and the second wheel base 202 is as shown in FIG. 13, and the engaging block 214 and the hub 48 of the second wheel set 18 are separate from each other. That is, the second wheel set 18 is capable of rotating relative to the second wheel base 202. At this time, as shown in FIG. 13, the limiting part 206 can protrude outward from the second wheel base 202 by elastic force provided from the return spring 208, so as to abut against a protruding structure 209 of the driving part 212. In such a manner, the driving part 212 can be positioned at the releasing position steadily.

At the same time, a position of the second engaging part 50 relative to the first end P$_1$ of the linkage part 26 and the first wheel base 22 is as shown in FIG. 4, and the engaging portion 58 of the second engaging part 50 and the hub 60 of the first wheel set 16 are separate from each other. That is, when the driving part 212 is located at the releasing position as shown in FIG. 13, the first wheel set 16 and the second wheel set 18 can rotate relative to the first wheel base 22 and the second wheel base 202, respectively.

Figure 14:
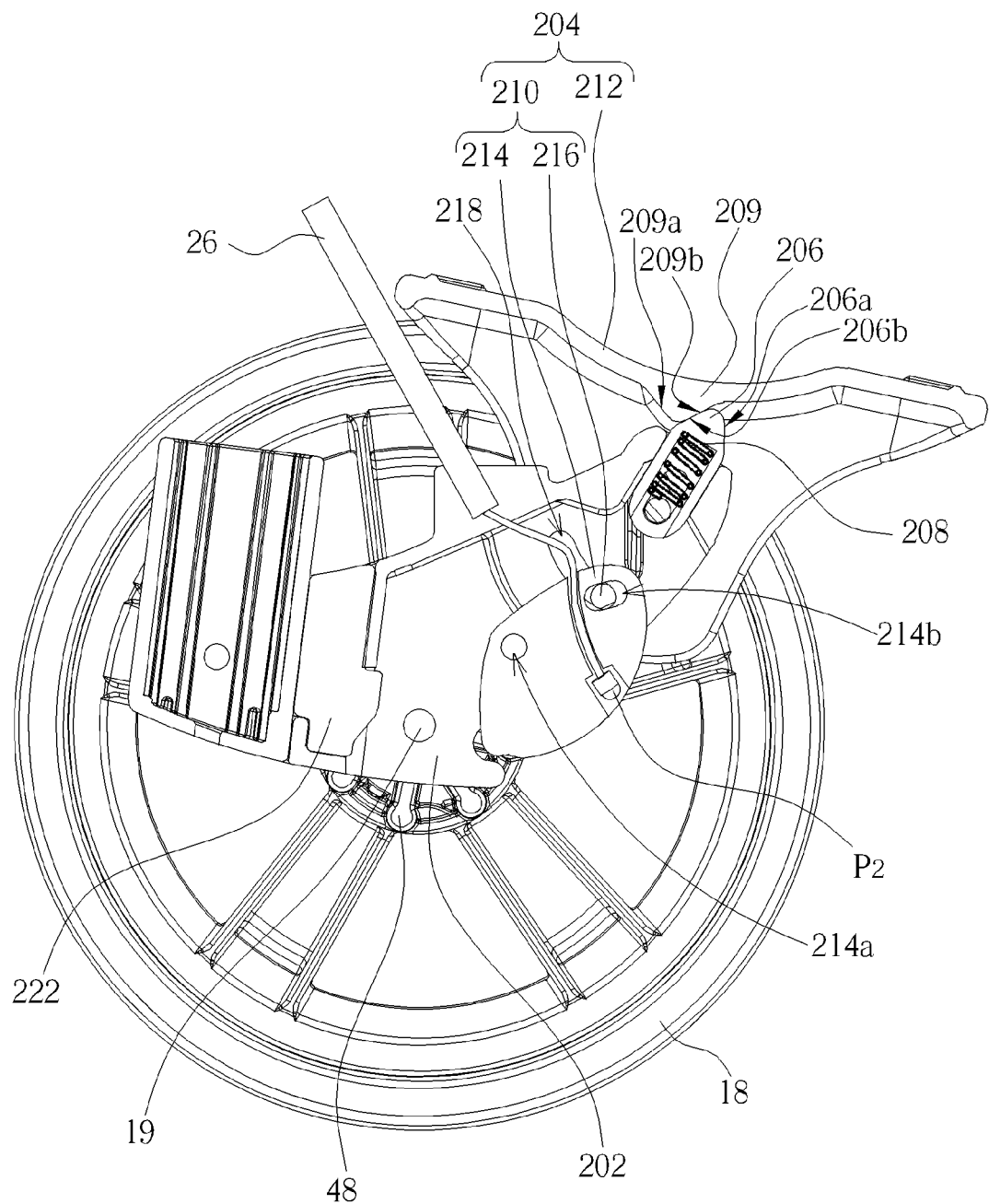
FIG. 14 is an interior diagram of the second wheel base and the active brake device in FIG. 13 when the driving part is located at a locking position.

Next, please refer to FIG. 14, which is an interior diagram of the second wheel base 202 and the active brake device 204 in FIG. 13 when the driving part 212 is located at the locking position. If the user wants to operate the active brake device 204 to brake the stroller 10, the user just needs to push the driving part 212 to rotate from the releasing position as shown in FIG. 13 to the locking position as shown in FIG. 14 relative to the second wheel base 202. At this time, the connecting rod 216 may drive the engaging block 214 to move along the slot hole 218 with rotation of the driving part 212 so that the engaging block 214 can be engaged with the hub 48 of the second wheel set 18. Thus, the second wheel set 18 is incapable of rotating relative to the second wheel base 202. Furthermore, the engaging block 214 may simultaneously pull the second end P$_2$ of the linkage part 26 to move from a position as shown in FIG. 13 to a position as shown in FIG. 14.

As for linkage of the limiting part 206 and the driving part 212, it may be as shown in FIG. 13 and FIG. 14. The protruding structure 209 has a first surface 209*a* and a second surface 209*b*, which are adjacent to each other, and the limiting part 206 has a third surface 206*a* and a fourth surface 206*b*, which are adjacent to each other. When the driving part 212 is located at the releasing position, the third surface 206*a* of the limiting part 206 may abut against the first surface 209*a* of the protruding structure 209 (as shown in FIG. 13), so as to position the driving part 212 at the releasing position steadily. During the driving part 212 rotates from the releasing position to the locking position, the limiting part 206 may be pushed by the protruding structure 209 so as to move inward relative to the opening 220 of the second wheel base 202. Subsequently, the limiting part 206 may move outward relative to the opening 220 by elastic force provided from the return spring 208 when moving along the contour of protruding structure 209, until the driving part 212 moves to the locking position. At this time, the fourth surface 206*b* of the limiting part 206 may abut against the second surface 209*b* of the protruding structure 209 by elastic force provided from the return spring 208 (as shown in FIG. 14), so as to position the driving part 212 at the locking position steadily. As for linkage of the passive brake device 30 and the linkage part 26 during the driving part 212 rotates to the locking position, the related description is omitted herein since it is the same as that mentioned in the first embodiment.

In brief, when the user pushes the driving part 212 to rotate to the locking position as shown in FIG. 14, the stroller 10 can constrain rotation of the first wheel set 16 and the second wheel set 18 via linkage of the active brake device 204, the linkage part 26, and the passive brake device 30, so that the purpose of braking the first wheel set 16 and the second wheel set 18 simultaneously can be achieved accordingly.

If the user wants to release the first engaging part 32 and the second engaging part 50, the user just needs to push the driving part 212 to the releasing position as shown in FIG. 13. At this time, the connecting rod 216 may push the engaging block 214 to move along the slot hole 218 of the second wheel base 202 with rotation of the driving part 212, so as to make the engaging block 214 separate from the hub 48 of the second wheel set 18. As mentioned in the first embodiment, the engaging portion 58 of the second engaging part 50 may also be separate from the hub 60 of the first wheel set 16 simultaneously. In such a manner, the first wheel set 16 and the second wheel set 18 can rotate relative to the first wheel base 22 and the second wheel base 202, respectively. Furthermore, as shown in FIG. 12 and FIG. 13, the brake mechanism 200 further includes two shock-absorbing blocks 222 which are disposed inside the first wheel base 22 and the second wheel base 202, respectively. The two shock-absorbing blocks 222 are used for absorbing shock received by the stroller 10.

Figure 15:
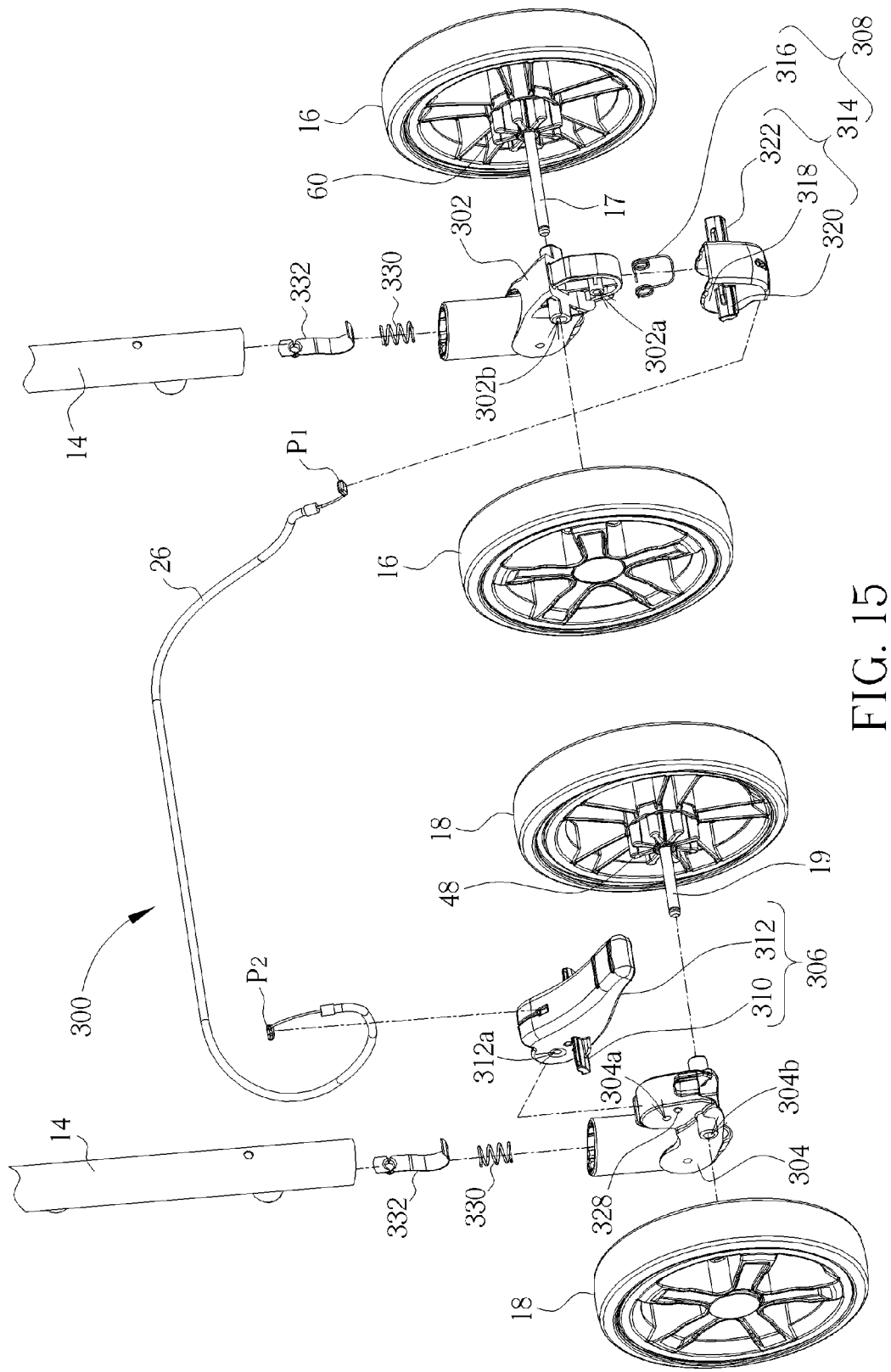
FIG. 15, which is an exploded diagram of a brake mechanism, the first wheel set, the second wheel set and the feet according to a fourth embodiment of the present invention.

Next, please refer to FIG. 15, which is an exploded diagram of a brake mechanism 300, the first wheel set 16, the second wheel set 18 and the feet 14 according to a fourth embodiment of the present invention. Components both mentioned in the first embodiment and the fourth embodiment represent components with similar functions or structures. The major difference between the brake mechanism 300 and the brake mechanisms mentioned in the above embodiments is the structural designs of the active brake device and the passive brake device and linkage of the linkage part relative to the active brake device and the passive brake device.

As shown in FIG. 15, the brake mechanism 300 includes the linkage part 26, a first wheel base 302, a second wheel base 304, an active brake device 306, and a passive brake device 308. The active brake device 306 includes a first engaging part 310 and a driving part 312. The first engaging part 310 is integrally formed with the driving part 312. The driving part 312 is connected to the second end P$_2$ of the linkage part 26 and is pivotally connected to the second wheel base 304 by utilizing a connecting rod (not shown in FIG. 15) to pass through its pivot hole 312*a* and a pivot hole 304*a* of the second wheel base 304. The second wheel set 18 is pivotally connected to the second wheel base 304 by utilizing the shaft 19 to pass through a pivot hole 304*b* of the second wheel base 304. The first engaging part 310 is used for engaging with the hub 48 of the second wheel set 18 when the driving part 312 rotates to a locking position relative to the second wheel base 304.

The passive brake device 308 includes a second engaging part 314 and a torsion spring 316. A pivot portion 318 of the second engaging part 314 is pivotally connected to the first wheel base 302 by utilizing a connecting rod (not shown in FIG. 15) to pass through a pivot hole 302*a* of the first wheel base 302, and the first wheel set 16 is pivotally connected to the first wheel base 302 by utilizing the shaft 17 to pass through a pivot hole 302*b* of the first wheel base 302. The first end P$_1$ of the linkage part 26 is connected to a connecting portion 320 of the second engaging part 314. The torsion spring 316 abuts against the first wheel base 302 and the connecting portion 320 of the second engaging part 314. The torsion spring 316 is used for driving the second engaging part 314 so as to make an engaging portion 322 of the second engaging part 314 be engaged with the hub 60 of the first wheel set 16.

Figure 16:
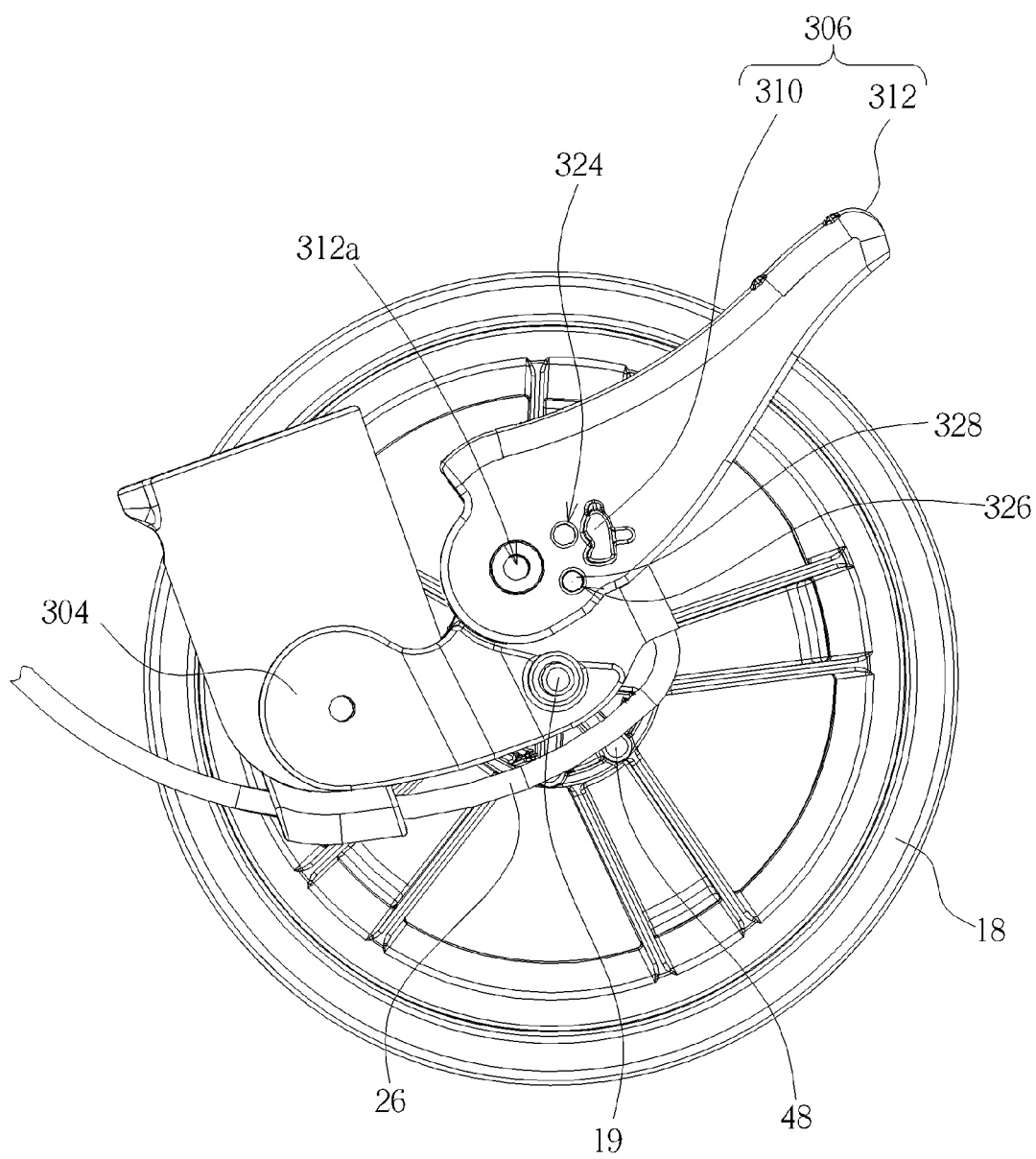
FIG. 16 is a diagram of a driving part in FIG. 15 being located at a releasing position.
Figure 17:
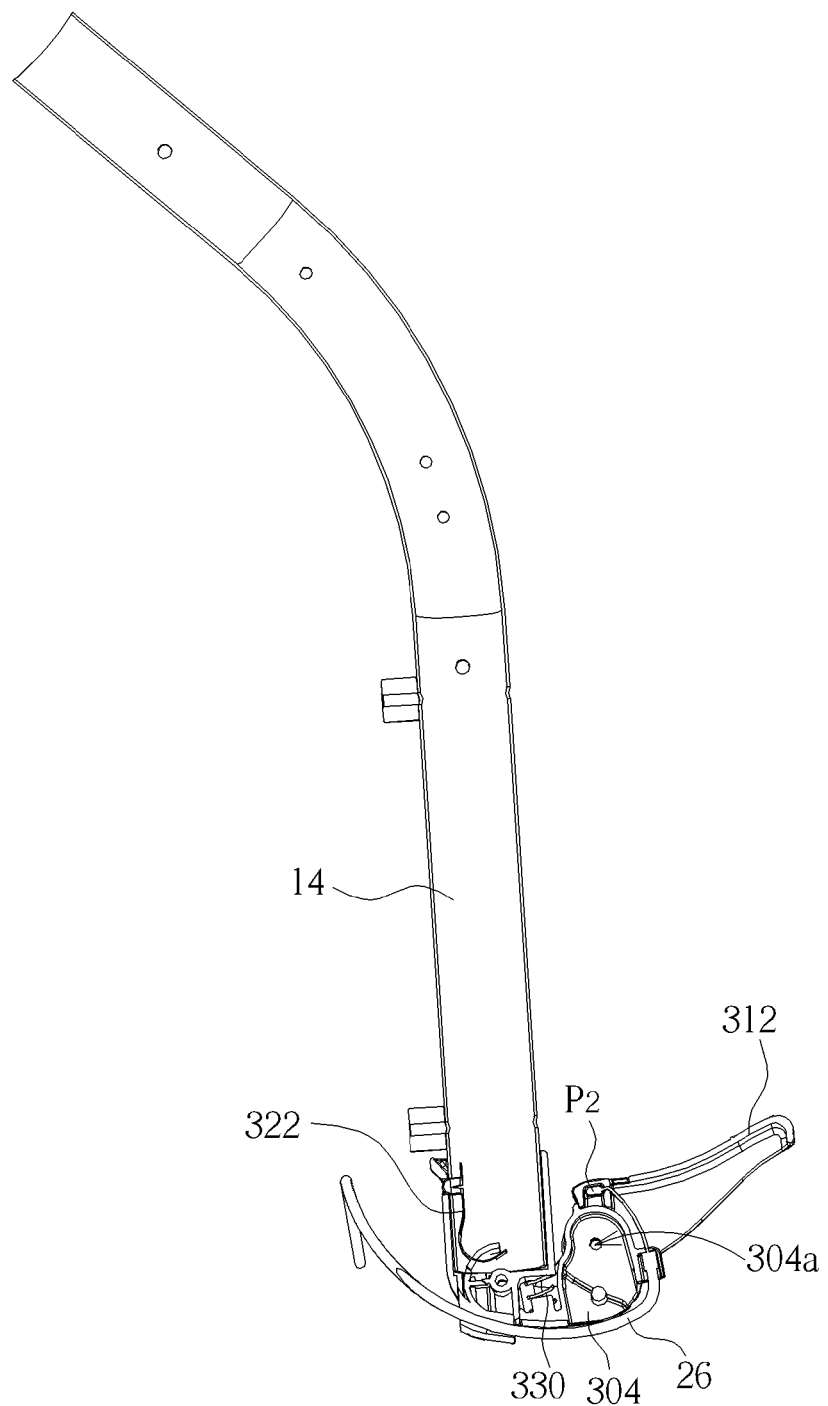
FIG. 17 is an interior diagram of an active brake device and a second wheel base in FIG. 16 when a driving part is located at the releasing position.
Figure 18:
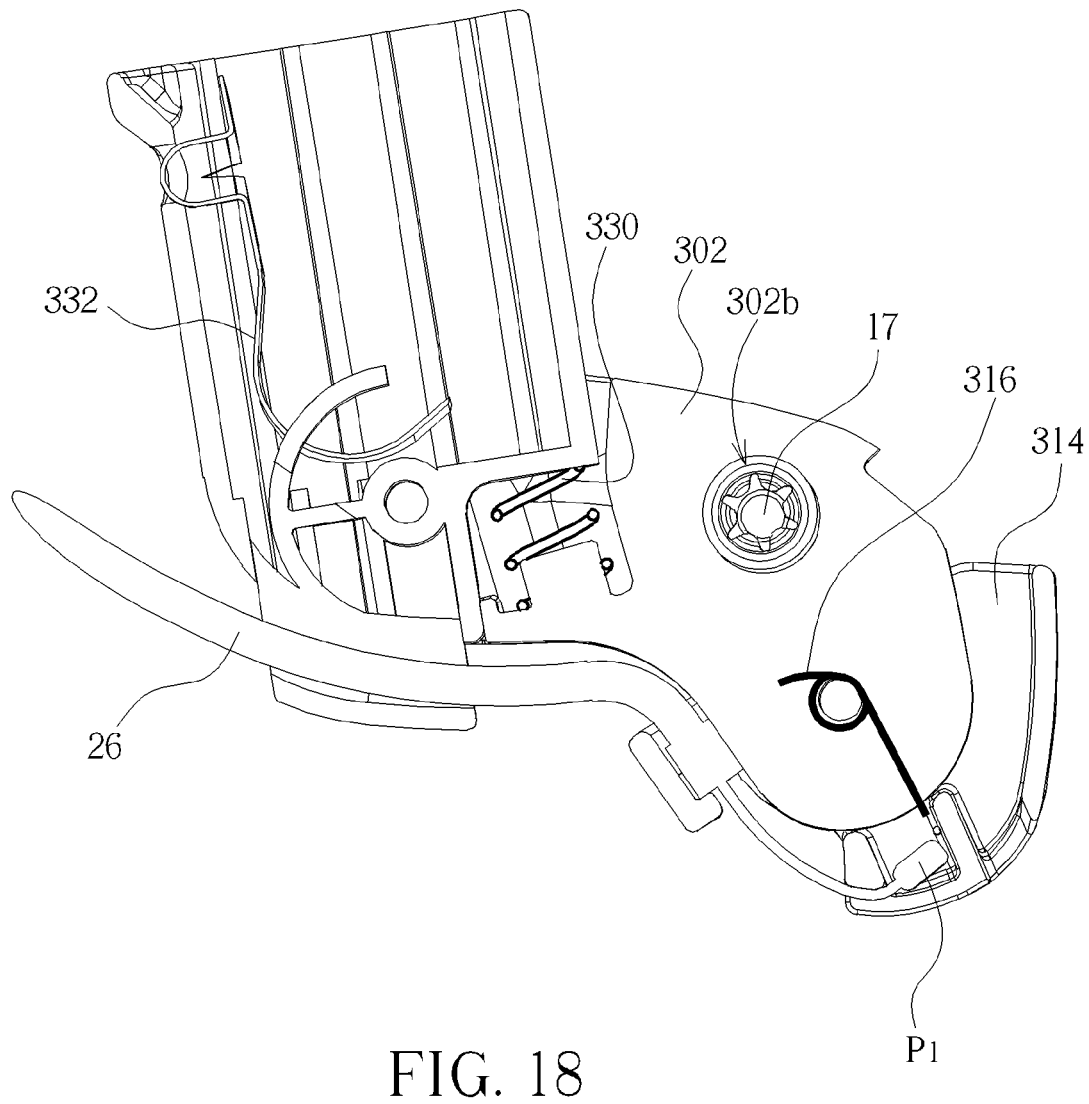
FIG. 18 is an interior diagram of a passive brake device and a first wheel base in FIG. 15 when the driving part is located at the releasing position.

More detailed description for linkage of the active brake device 306, the linkage part 26 and the passive brake device 308 is provided as follows. Please refer to FIG. 16, FIG. 17 and FIG. 18. FIG. 16 is a diagram of the driving part 312 in FIG. 15 being located at a releasing position. FIG. 17 is an interior diagram of the active brake device 306 and the second wheel base 304 in FIG. 16 when the driving part 312 is located at the releasing position. FIG. 18 is an interior diagram of the passive brake device 308 and the first wheel base 302 in FIG. 15 when the driving part 312 is located at the releasing position. First, as shown in FIG. 15 and FIG. 16, a first positioning hole 324 and a second positioning hole 326 are formed on the driving part 312. A protruding spot 328 is formed on the second wheel base 304. The protruding spot 328 is used for engaging with the first positioning hole 324 when the driving part 312 rotates to the locking position relative to the second wheel base 304 and engaging with the second positioning hole 326 when the driving part 312 rotates to the releasing position relative to the second wheel base 304.

Next, when the driving part 312 rotates to the releasing position as shown in FIG. 16 relative to the second wheel base 304, a position of the driving part 312 relative to the second end $P_2$ of the linkage part 26 and the second wheel base 304 is as shown in FIG. 17, and the first engaging part 310 and the hub 48 of the second wheel set 18 are separate from each other, meaning that the second wheel set 18 can rotate relative to the second wheel base 304. As mentioned above, when the driving part 312 rotates to the releasing position, the protruding spot 328 may be engaged with the second positioning hole 326 simultaneously. Thus, the driving part 312 can be positioned at the releasing position steadily.

At the same time, a position of the second engaging part 314 relative to the first end $P_1$ of the linkage part 26 and the first wheel base 302 is as shown in FIG. 18, and the engaging portion 322 of the second engaging part 314 and the hub 60 of the first wheel set 16 are separate from each other. That is, when the driving part 312 is located at the releasing position as shown in FIG. 16, the first wheel set 16 and the second wheel set 18 are capable of rotating relative to the first wheel base 302 and the second wheel base 304, respectively, so that the user can push the stroller 10 to move forward easily.

Figure 19:
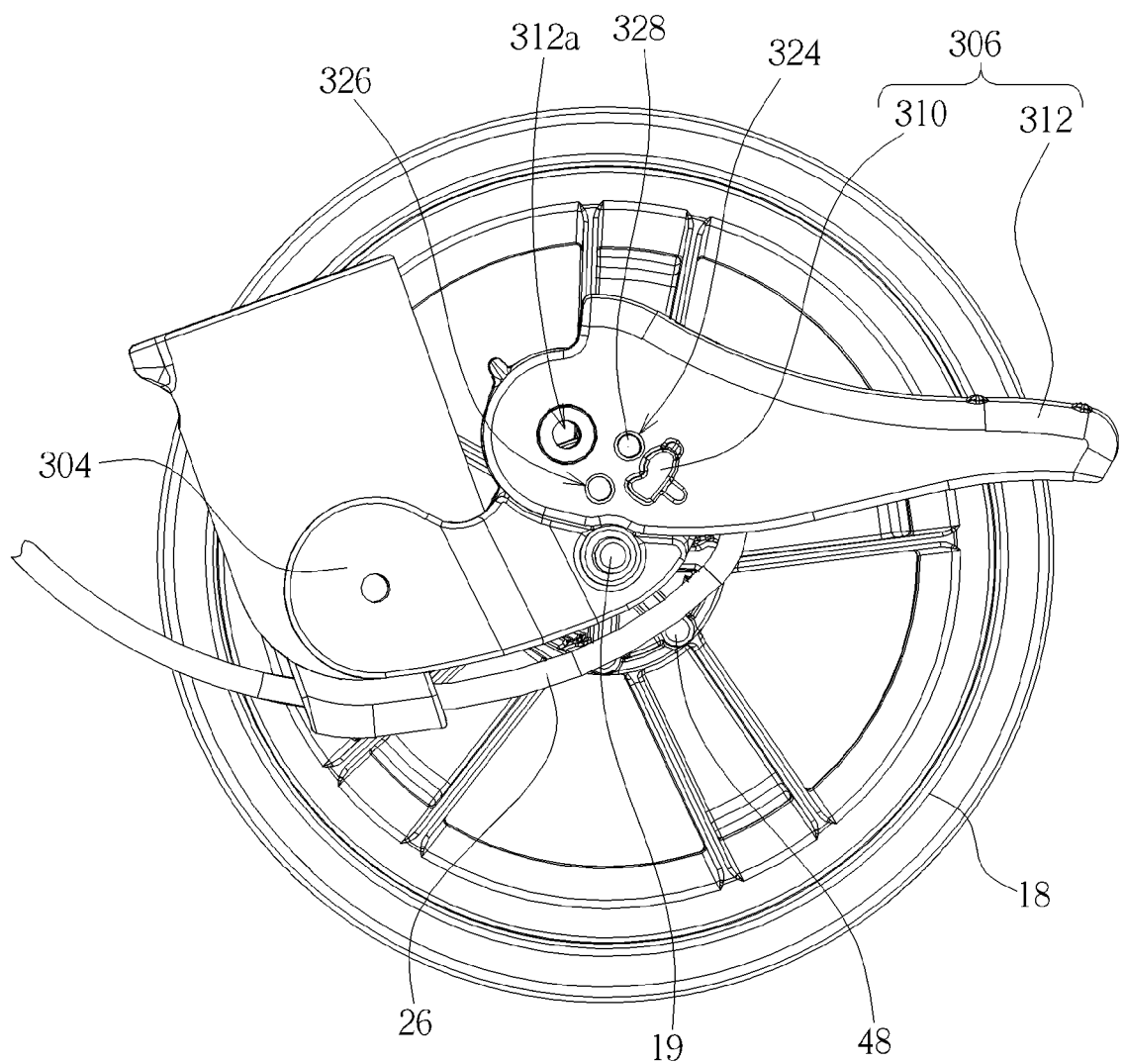
FIG. 19 is a diagram of the driving part in FIG. 16 rotating to a locking position relative to the second wheel base.
Figure 20:
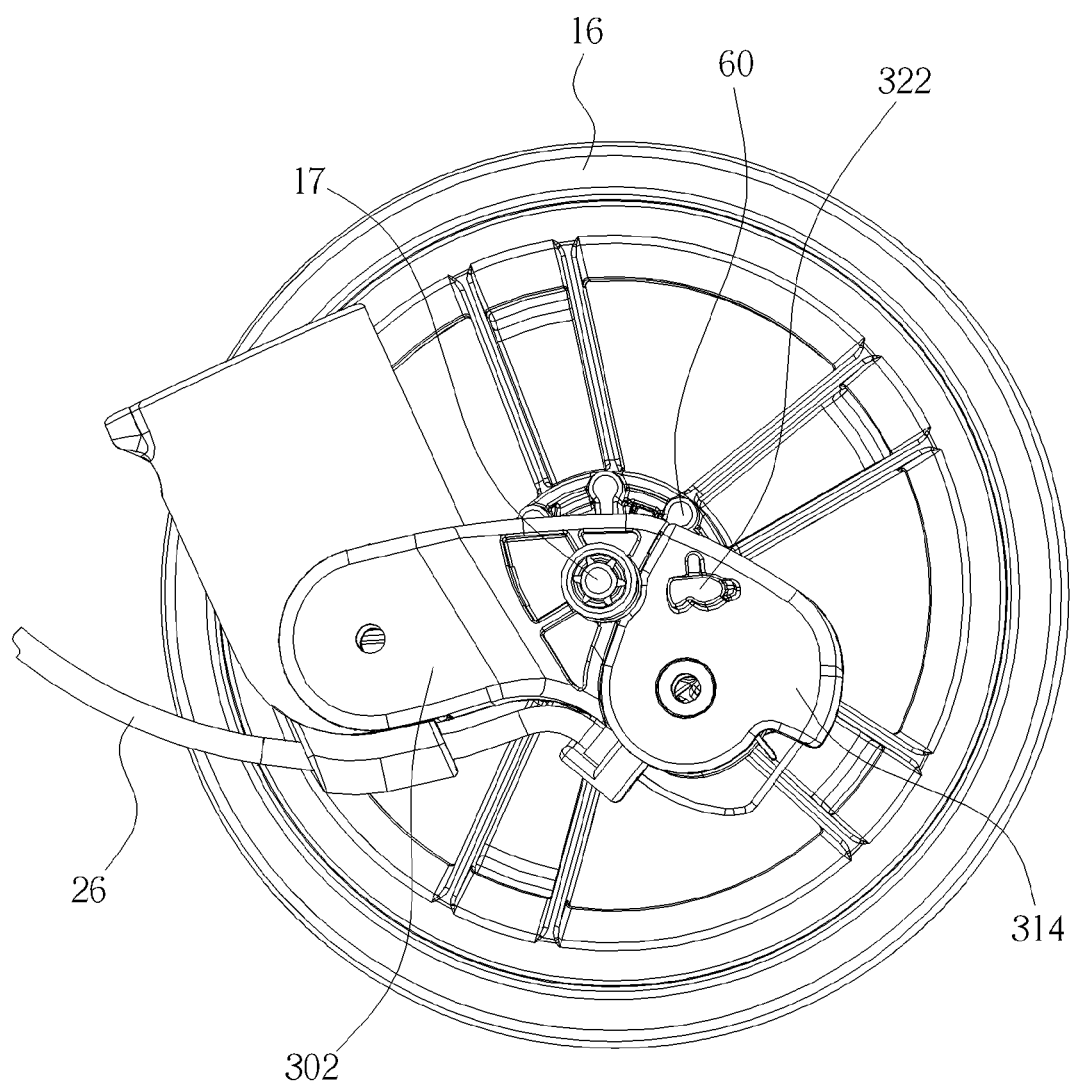
FIG. 20 is a diagram of a second engaging part in FIG. 15 being engaged with a hub of the first wheel set.

Next, please refer to FIG. 19 and FIG. 20. FIG. 19 is a diagram of the driving part 312 in FIG. 16 rotating to the locking position relative to the second wheel base 304. FIG. 20 is a diagram of the second engaging part 314 in FIG. 15 being engaged with the hub 60 of the first wheel set 16. If the user wants to operate the active brake device 306 to brake the stroller 10, the user just needs to push the driving part 312 to rotate from the releasing position as shown in FIG. 16 to the locking position as shown in FIG. 19 relative to the second wheel base 304. At this time, the first engaging part 310 may be engaged with the hub 48 of the second wheel set 18 with rotation of the driving part 312 so as to make the second wheel set 18 incapable of rotating relative to the second wheel base 304. Furthermore, since the protruding spot 328 on the second wheel base 304 may also be engaged with the first positioning hole 324 simultaneously, the driving part 312 can be positioned at the locking position steadily.

On the other hand, since the second end $P_2$ of the linkage part 26 is no longer pulled by the driving part 312, the second engaging part 314 may rotate from a position as shown in FIG. 18 to a position as shown in FIG. 20 relative to the first wheel base 302 by elastic force provided from the torsion spring 316, so as to make the engaging portion 322 of the second engaging part 314 be engaged with the hub 60 of the first wheel set 16. In brief, when the user pushes the driving part 312 to rotate from the locking position as shown in FIG. 19, the stroller 10 can constrain rotation of the first wheel set 16 and the second wheel set 18 via linkage of the active brake device 306, the linkage part 26, and the passive brake device 308.

If the user wants to release engagement of the first engaging part 310 and the second wheel set 18 and engagement of the second engaging part 314 and the first wheel set 16, the user just needs to push the driving part 312 to rotate from the locking position as shown in FIG. 19 to the releasing position as shown in FIG. 16 relative to the second wheel base 304 and make the protruding spot 328 be engaged with the second positioning hole 326. At this time, the first engaging part 310 may be separate from the hub 48 of the second wheel set 18 with rotation of the driving part 312. As far as the passive brake device 308 is concerned, the second end $P_2$ of the linkage part 26 can drive the engaging portion 322 of the second engaging part 314 to overcome elastic force provided from the torsion spring 316, so as to make the second engaging part 314 separate from the hub 60 of the first wheel set 16. Thus, the first wheel set 16 and the second wheel set 18 can rotate relative to the first wheel base 302 and the second wheel base 304, respectively.

Furthermore, as shown in FIG. 15, FIG. 17 and FIG. 18, the brake mechanism 300 further includes two shock-absorbing springs 330 and two elastic sheets 332. The two shock-absorbing springs 330 are disposed inside the first wheel base 302 and the second wheel base 304, respectively, for absorbing shock received by the stroller 10. The two elastic sheets 332 are disposed between the foot 14 and the first wheel base 302 and between the foot 14 and the second wheel base 304, respectively. The two elastic sheets 332 are used for fixing the first wheel base 302 and the second wheel base 304 onto the feet 14, respectively.

Figure 21:
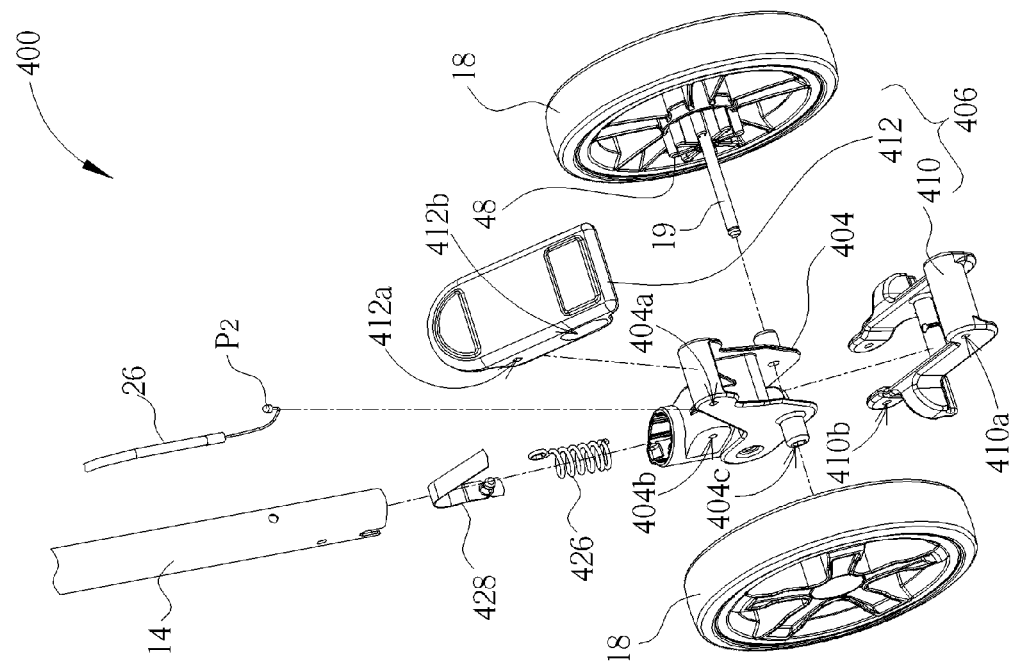
FIG. 21 is an exploded diagram of a brake mechanism, the first wheel set, the second wheel set and the feet according to a fifth embodiment of the present invention.
Figure 21:
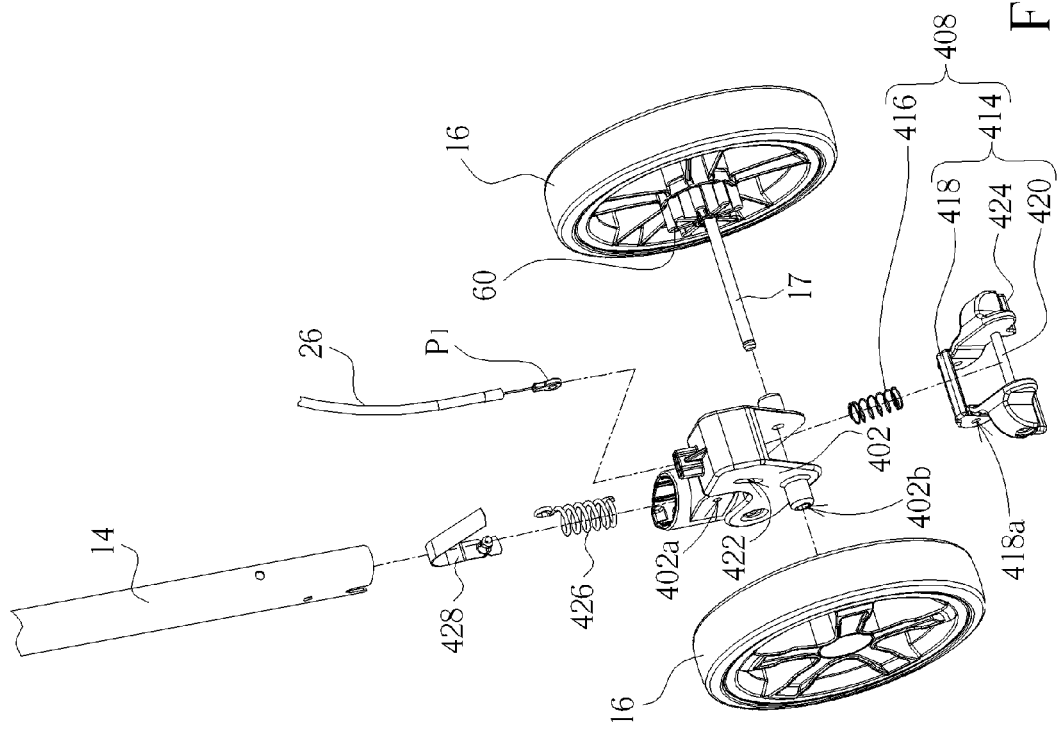

Next, please refer to FIG. 21, which is an exploded diagram of a brake mechanism 400, the first wheel set 16, the second wheel set 18 and the feet 14 according to a fifth embodiment of the present invention. Components both mentioned in the fourth embodiment and the fifth embodiment represent components with similar functions or structures. The major difference between of the brake mechanism 400 and the brake mechanism 300 is the structural designs of the active brake device and the passive brake device. As shown in FIG. 21, the brake mechanism 400 includes the linkage part 26, a first wheel base 402, a second wheel base 404, an active brake device 406, and a passive brake device 408.

The active brake device 406 includes a first engaging part 410 and a driving part 412. The first engaging part 410, the driving part 412, and the second wheel base 404 are mutually pivotally connected to each other. That is, the driving part 412 is pivotally connected to the second wheel base 404 by utilizing a connecting rod (not shown in FIG. 21) to pass through its pivot hole 412a and a pivot portion 404a of the second wheel base 404, and is pivotally connected to the first engaging part 410 by utilizing a connecting rod (not shown in FIG. 21) to pass through its pivot hole 410b and a pivot portion 404b of the second wheel base 404. Furthermore, the second wheel set 18 is pivotally connected to the second wheel base 404 by utilizing the shaft 19 to pass through a pivot hole 404c of the second wheel base 404. The second end $P_2$ of the linkage part 26 is connected to the first engaging part 410. The driving part 412 is used for driving the first engaging part 410 to be engaged with the hub 48 of the second wheel set 18 when the driving part 412 rotates to a locking position relative to the second wheel base 404.

The passive brake device 408 includes a second engaging part 414 and a spring 416. A pivot portion 418 of the second engaging part 414 is pivotally connected to the first wheel base 402 by utilizing a connecting rod (not shown in FIG. 21)

to pass through its pivot hole 418a and a pivot portion 402a of the first wheel base 402. The first wheel set 16 is pivotally connected to the first wheel base 402 by utilizing the shaft 17 to pass through a pivot hole 402b of the first wheel base 402. Furthermore, a connecting portion 420 of the second engaging part 414 is connected to the first end $P_1$ of the linkage part 26 and is disposed through a slot hole 422 of the first wheel base 402. The spring 416 envelops the first end $P_1$ of the linkage part 26 and abuts against the first wheel base 402 and the connecting portion 420 of the second engaging part 414. The spring 416 is used for driving an engaging portion 424 of the second engaging part 414 to be engaged with the hub 60 of the first wheel set 16 when the driving part 412 rotates to the locking position relative to the second wheel base 404.

Figure 22:
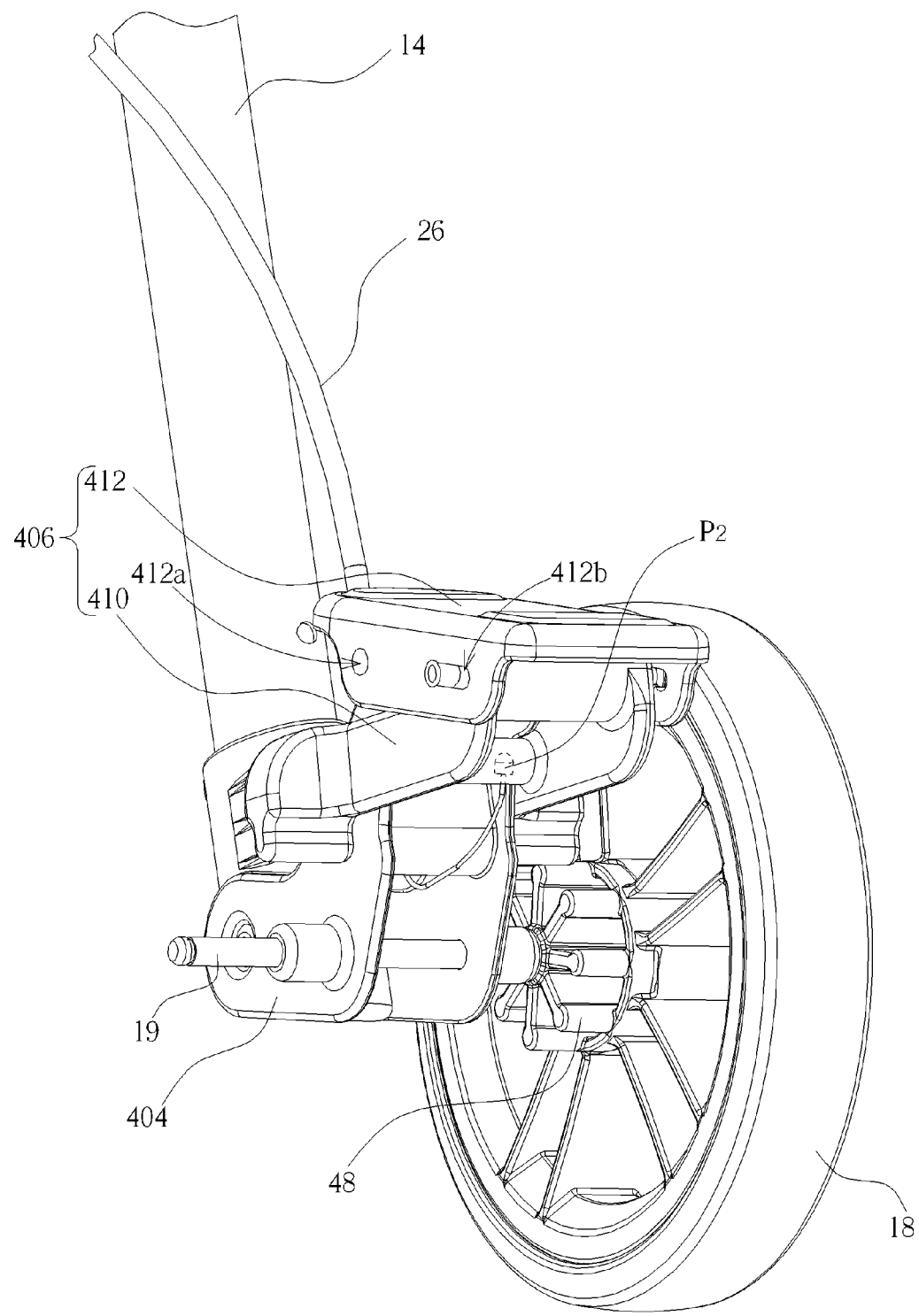
FIG. 22 is a diagram of a driving part in FIG. 21 being located at a releasing position.
Figure 23:
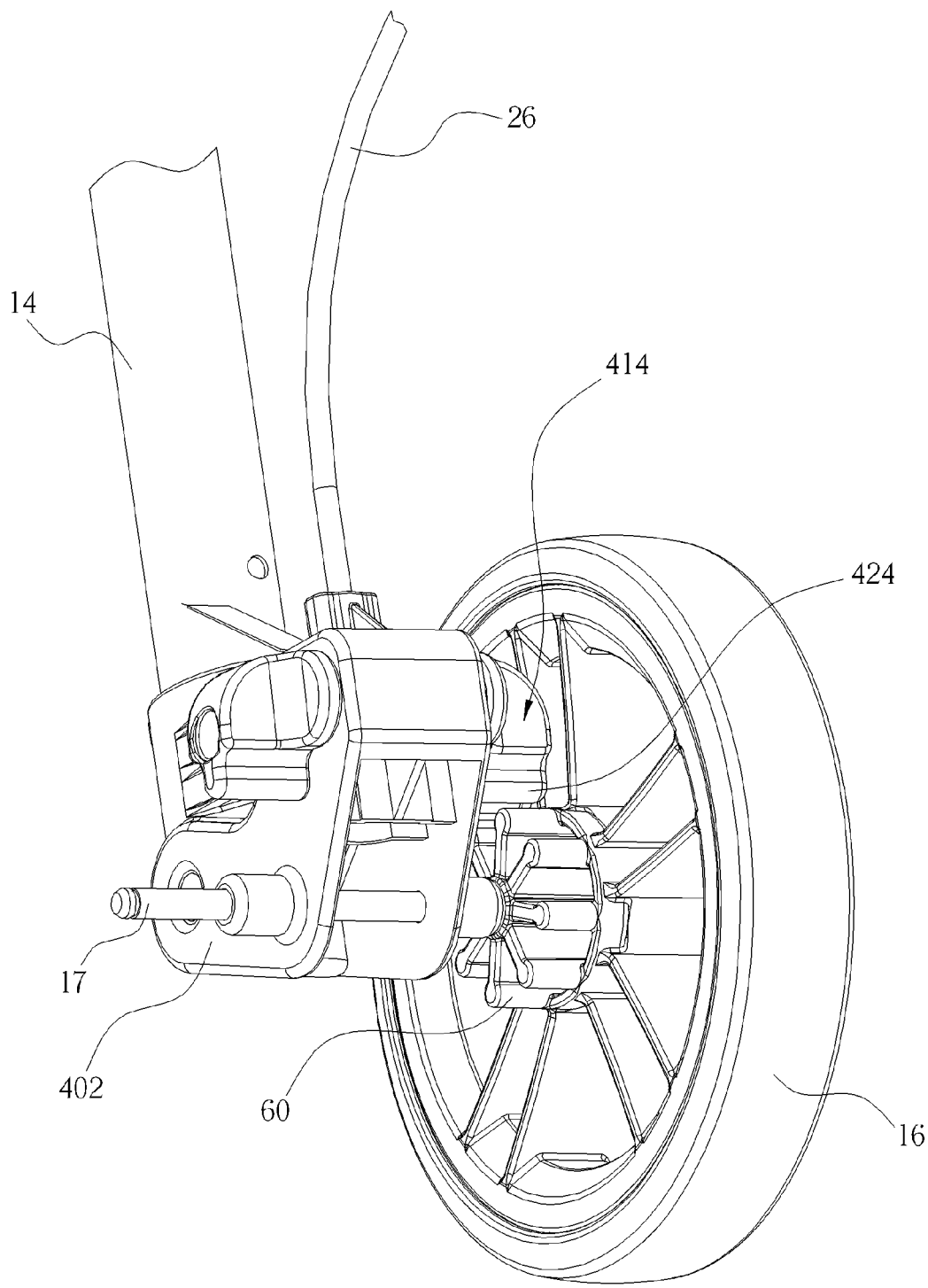
FIG. 23 is a diagram of a second engaging part in FIG. 21 being separate from the hub of the first wheel set.

More detailed description for linkage of the active brake device 406, the linkage part 26 and the passive brake device 408 is provided as follows. Please refer to FIG. 22 and FIG. 23. FIG. 22 is a diagram of the driving part 412 in FIG. 21 being located at a releasing position. FIG. 23 is a diagram of the second engaging part 414 in FIG. 21 being separate from the hub 60 of the first wheel set 16. When the driving part 412 rotates to the releasing position as shown in FIG. 22 relative to the second wheel base 404, the driving part 412 drives the first engaging part 410 to rotate to a position as shown in FIG. 22 so as to make the first engaging part 410 be separate from the hub 48 of the second wheel set 18, and the second end $P_2$ of the linkage part 26 is pulled accordingly. At the same time, since the second end $P_2$ of the linkage part 26 is pulled with rotation of the first engaging part 410, the first end $P_1$ of the linkage part 26 may pull the connecting portion 420 of the second engaging part 414 to move upward along the slot hole 422 so as to make the engaging portion 424 of the second engaging part 414 be separate from the hub 60 of the first wheel set 16 (as shown in FIG. 23). That is, when the driving part 412 is located at the releasing position as shown in FIG. 22, the first wheel set 16 and the second wheel set 18 can rotate relative to the first wheel base 402 and the second wheel base 404, respectively.

Figure 24:
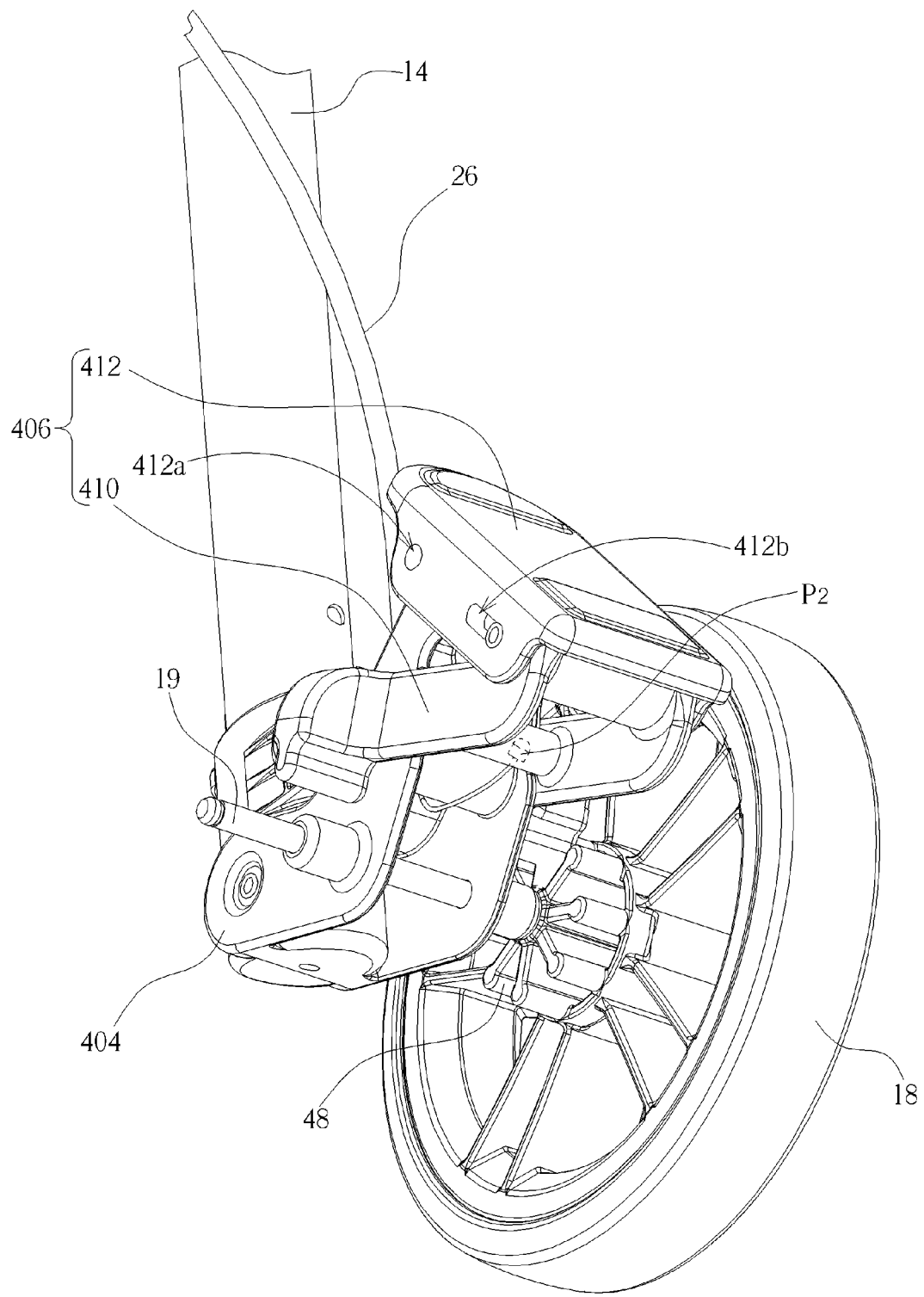
FIG. 24 is a diagram of the driving part in FIG. 22 rotating to a locking position relative to a second wheel base.
Figure 25:
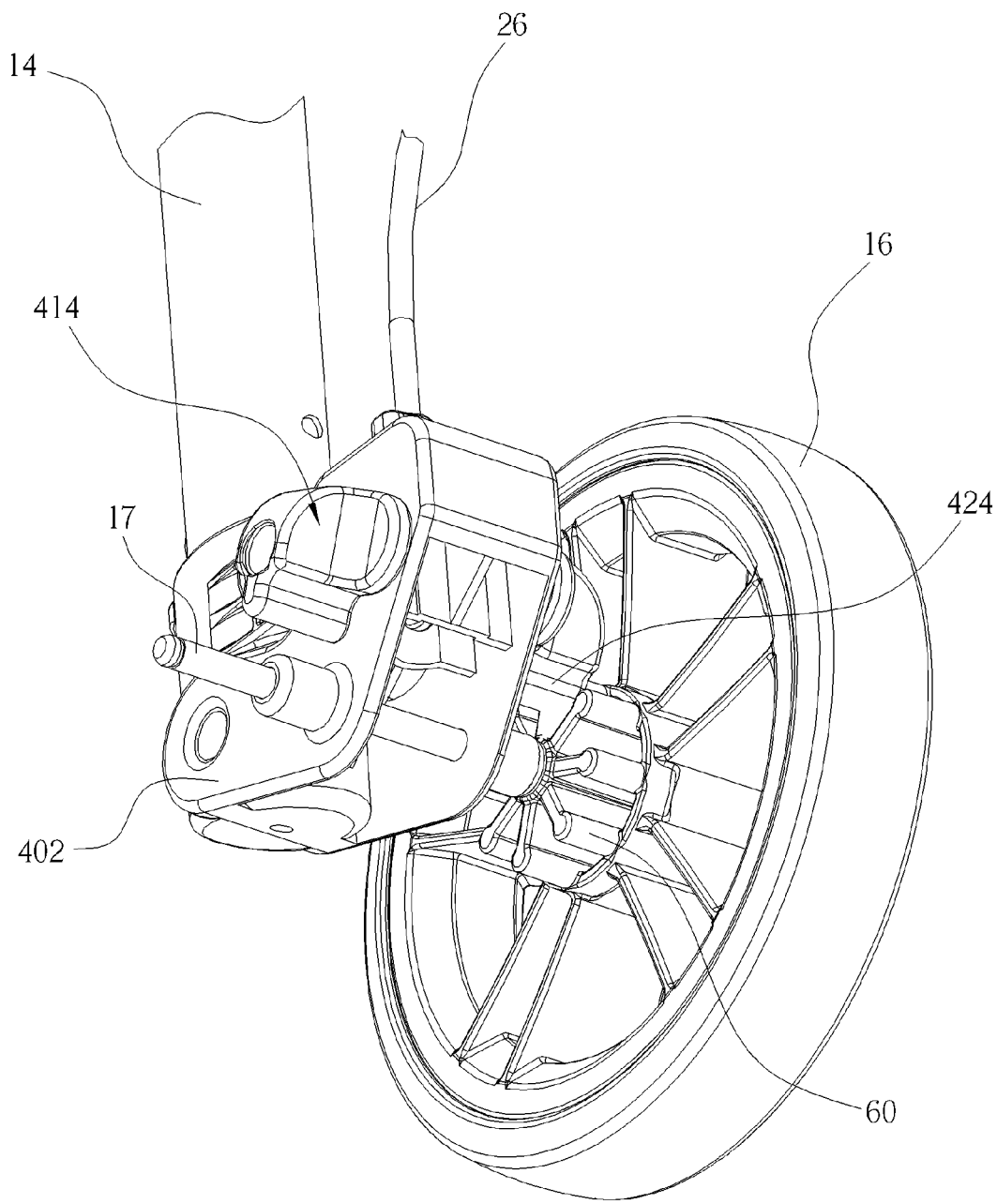
FIG. 25 is a diagram of an engaging portion of the second engaging part in FIG. 22 being engaged with the hub of the first wheel set.
Figure 26:
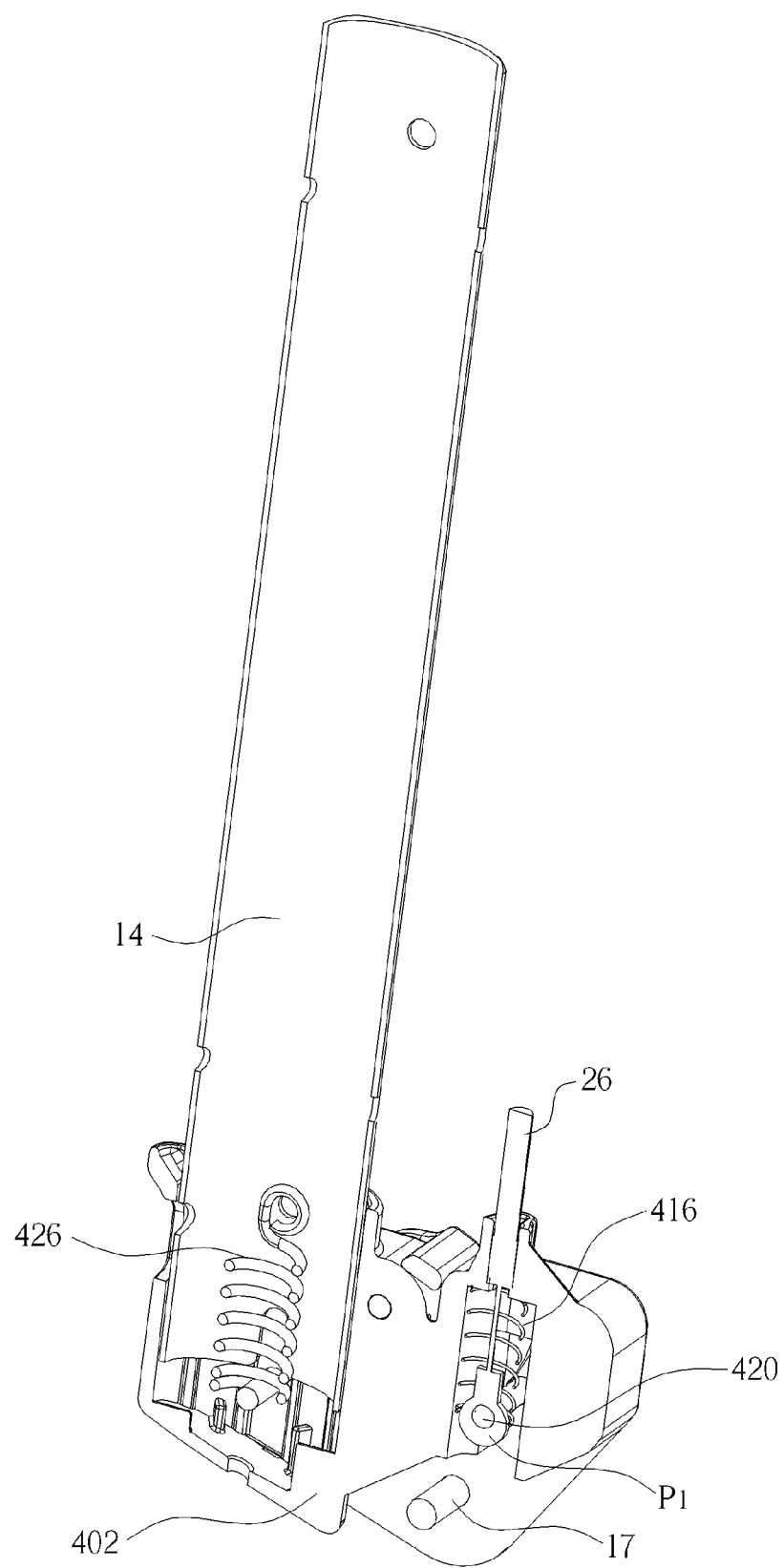
FIG. 26 is a sectional diagram of the foot and a first wheel base in FIG. 25 when the driving part is located at the locking position.

Next, please refer to FIG. 24, FIG. 25, and FIG. 26. FIG. 24 is a diagram of the driving part 412 in FIG. 22 rotating to the locking position relative to the second wheel base 404. FIG. 25 is a diagram of the engaging portion 424 of the second engaging part 414 in FIG. 22 being engaged with the hub 60 of the first wheel set 16. FIG. 26 is a sectional diagram of the foot 14 and the first wheel base 402 in FIG. 25 when the driving part 412 is located at the locking position. If the user wants to operate the active brake device 406 to brake the stroller 10, the user just needs to push the driving part 412 to rotate from the releasing position as shown in FIG. 22 to the locking position as shown in FIG. 24 relative to the second wheel base 404. At this time, the first engaging part 410 is engaged with the hub 48 of the second wheel set 18 with rotation of the driving part 412, so as to make the second wheel set 18 incapable of rotating relative to the second wheel base 404.

On the other hand, since the second end $P_2$ of the linkage part 26 is no longer pulled by the driving part 412, the spring 416 may provide elastic force to move the connecting portion 420 of the second engaging part 414 along the slot hole 422 until the connecting portion 420 is engaged with the hub 60 of the first wheel set 16 (as shown in FIG. 25). In brief, when the user pushes the driving part 412 to rotate to the locking position as shown in FIG. 24, the stroller 10 can constrain rotation of the first wheel set 16 and the second wheel set 18 via linkage of the active brake device 406, the linkage part 26, and the passive brake device 408.

If the user wants to release engagement of the first engaging part 410 and the second wheel set 18 and engagement of the second engaging part 414 and the first wheel set 16, the user just needs to push the driving part 412 to rotate from the locking position as shown in FIG. 24 to the releasing position as shown in FIG. 22. At this time, the first engaging part 410 is separate from the hub 48 of the second wheel set 18. As to the passive brake device 408, the passive brake device 408 can utilize pulling force provided by the driving part 412 to drive the connecting portion 420 of the second engaging part 414 to move upward along the slot hole 422. Thus, the engaging portion 424 of the second engaging part 414 can be separate from the hub 60 of the first wheel set 16 accordingly. In such a manner, the first wheel set 16 and the second wheel set 18 can rotate relative to the first wheel base 402 and the second wheel base 404, respectively.

Furthermore, as shown in FIG. 21 and FIG. 26, the brake mechanism 400 further includes two shock-absorbing springs 426 and two elastic sheets 428. The two shock-absorbing springs 426 are disposed between the foot 14 and the first wheel base 402 (as shown in FIG. 26) and between the foot 14 and the second wheel base 404, respectively, for absorbing shock received by the stroller 10. The two elastic sheets 428 are disposed between the foot 14 and the first wheel base 402, and between the foot 14 and the second wheel base 404, respectively. The two elastic sheets 428 are used for fixing the first wheel base 402 and the second wheel base 404 onto the feet 14, respectively.

Figure 27:
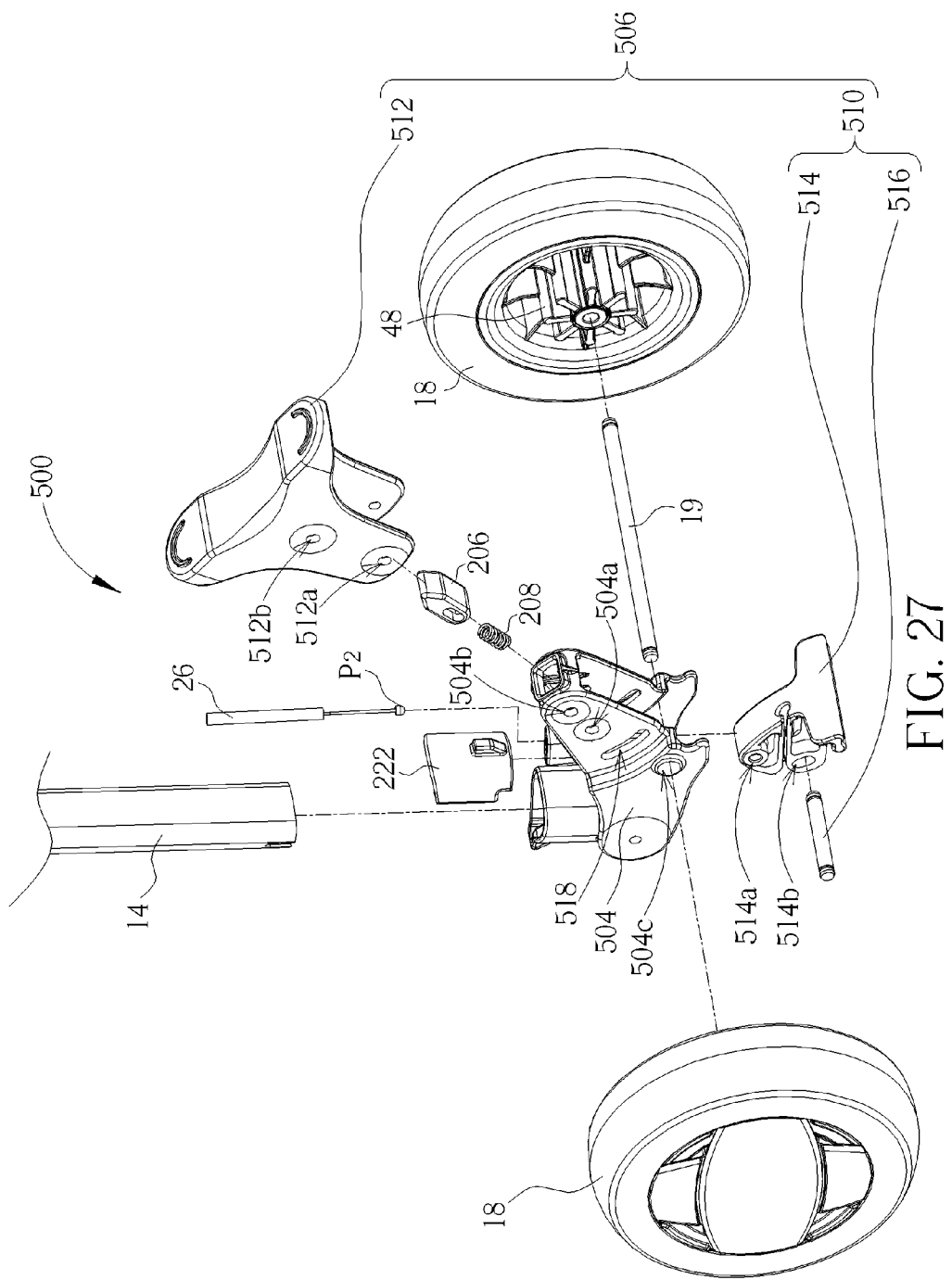
FIG. 27 is a partial exploded diagram of a brake mechanism, the second wheel set, and the foot according to a sixth embodiment of the prevent invention.
Figure 28:
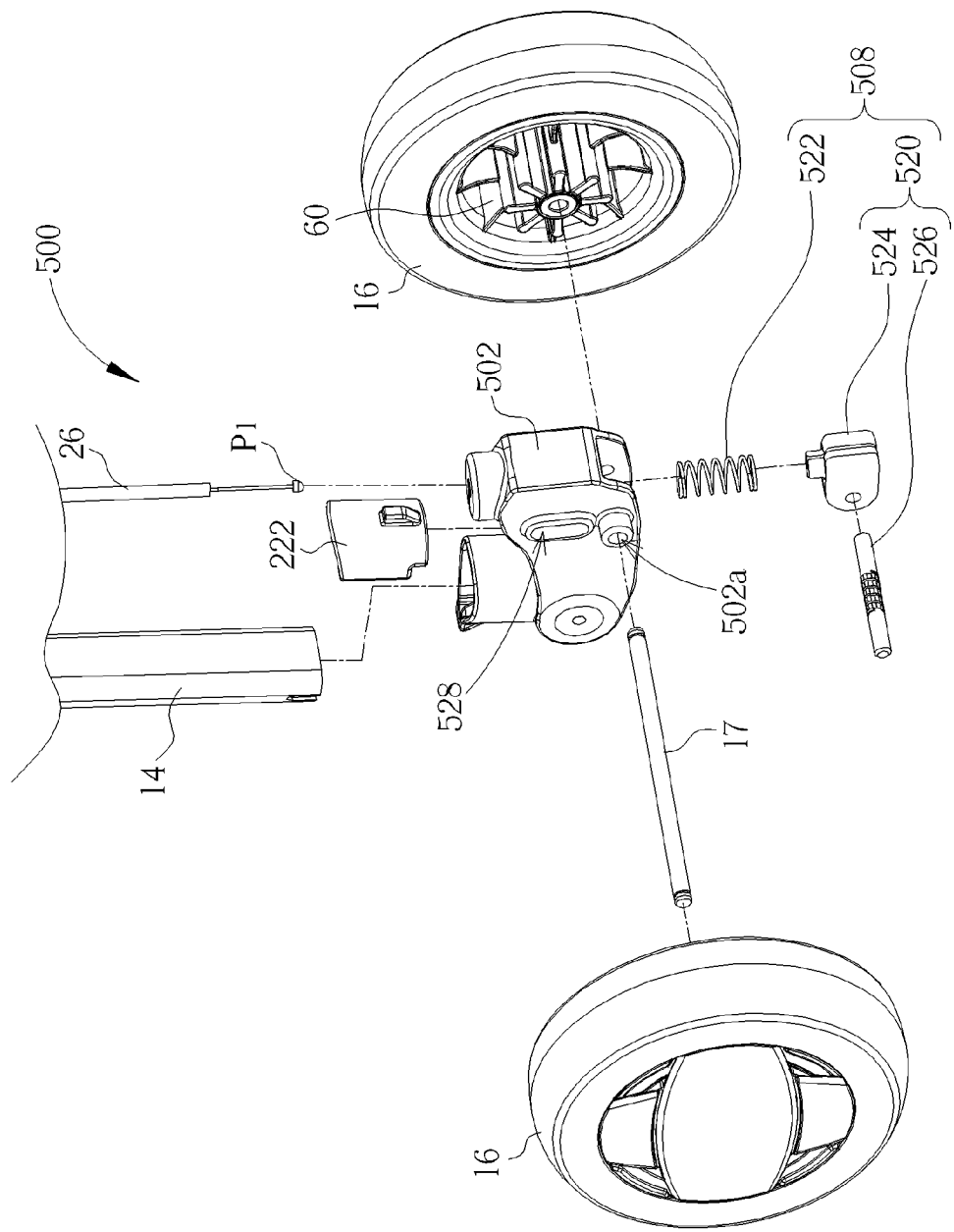
FIG. 28 is a partial exploded diagram of the brake mechanism in FIG. 27, the first wheel set, and the foot.

Finally, please refer to FIG. 27 and FIG. 28. FIG. 27 is a partial exploded diagram of a brake mechanism 500, the second wheel set 18, and the foot 14 according to a sixth embodiment of the prevent invention. FIG. 28 is a partial exploded diagram of the brake mechanism 500 in FIG. 27, the first wheel set 16, and the foot 14. Components both mentioned in the sixth embodiment and the third embodiment represent components with similar functions or structures. The major difference between the brake mechanism 500 and the brake mechanism 200 is the structural designs of the active brake device and the passive brake device. As shown in FIG. 27 and FIG. 28, the brake mechanism 500 includes the linkage part 26 (only partially shown), the limiting part 206, the return spring 208, a first wheel base 502, a second wheel base 504, an active brake device 506, and a passive brake device 508.

As shown in FIG. 27, the active brake device 506 includes a first engaging part 510 and a driving part 512. The first engaging part 510 is used for engaging with the hub 48 of the second wheel set 18. The first engaging part 510 includes an engaging block 514 and a connecting rod 516. The engaging block 514 is connected to the second end $P_2$ of the linkage part 26 and is pivotally connected to the second wheel base 504 by utilizing a connecting rod (not shown in FIG. 27) to pass through its pivot hole 514a and a pivot hole 504a of the second wheel base 504. The connecting rod 516 is disposed through a pivot hole 512a of the driving part 512, a pivot hole 514b of the engaging part 514, and a slot hole 518 of the second wheel base 504. The driving part 512 is pivotally connected to the second wheel base 504 by utilizing a connecting rod (not shown in FIG. 27) to pass through its pivot hole 512b and a pivot hole 504b of the second wheel base 504, so that the driving part 512 is capable of rotating between a locking position and a releasing position relative to the second wheel base 504. Furthermore, the second wheel set 18 is pivotally connected to the second wheel base 504 by utilizing the shaft 19 to pass through a pivot hole 504c of the second wheel base 504.

As shown in FIG. 28, the passive brake device 508 includes a second engaging part 520 and a spring 522. The second engaging part 520 includes a sliding block 524 and an engaging rod 526. The first end $P_1$ of the linkage part 26 is connected to the sliding block 524. The engaging rod 526 passes through the sliding block 524 and is disposed through a slot hole 528 of the first wheel base 502. The spring 522 abuts against the sliding block 524 and the first wheel base 502. The spring 522 is used for driving the sliding block 524 when the driving part 512 rotates to the locking position relative to the second wheel base 504. In such a manner, the engaging rod 526 can move along the slot hole 528 accordingly to be engaged with the hub 60 of the first wheel set 16. Furthermore, the first wheel set 16 is pivotally connected to the first wheel base 502 by utilizing the shaft 17 to pass through a pivot hole 502a of the first wheel base 502.

Figure 29:
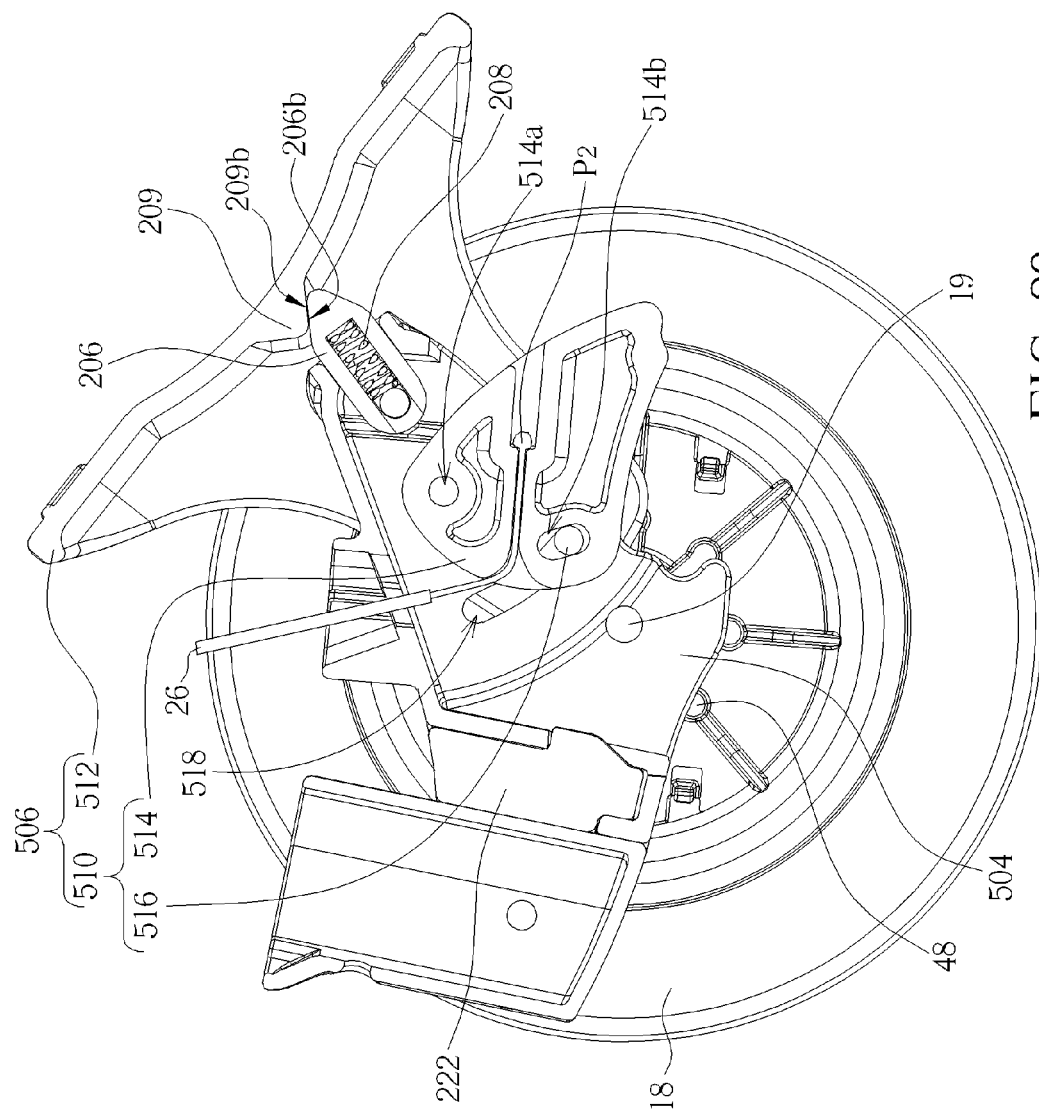
FIG. 29 is an interior diagram of a second wheel base and an active brake device when a driving part is located at a releasing position.

More detailed description for linkage of the active brake device 506, the linkage part 26, and the passive brake device 508 is provided as follows. Please refer to FIG. 29, which is an interior diagram of the second wheel base 504 and the active brake device 506 when the driving part 512 is located at the releasing position. When the driving part 512 rotates to the releasing position as shown in FIG. 29 relative to the second wheel base 504, a position of the first engaging part 510 relative to the second end $P_2$ of the linkage part 26 and the second wheel base 504 is as shown in FIG. 29, and the engaging block 514 and the hub 48 of the second wheel set 18 are separate from each other, meaning that the second wheel set 18 can rotate relative to the second wheel base 504. At this time, as shown in FIG. 29, the return spring 208 disposed inside the limiting part 206 may provide the limiting part 206 with elastic force so that the limiting part 206 can protrude outward from the second wheel base 504 to abut against the protruding structure 209 of the driving part 512. Thus, the driving part 512 can be positioned at the releasing position.

Figure 30:
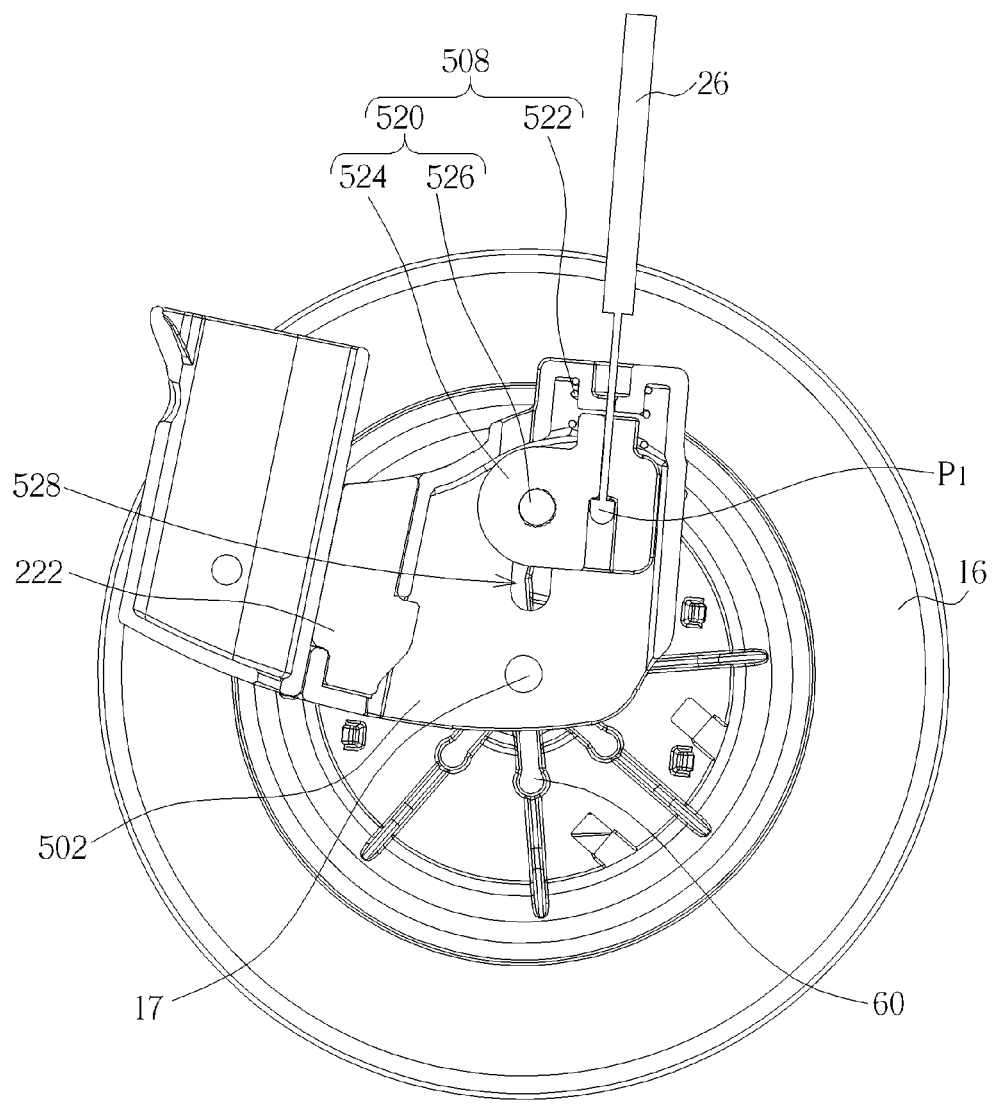
FIG. 30 is an interior diagram of a first wheel base and a passive brake device in FIG. 28 when the driving part is located at the releasing position.

At the same time, a position of the second engaging part 520 relative to the first end $P_1$ of the linkage part 26 and the first wheel base 502 is as shown in FIG. 30, which is an interior diagram of the first wheel base 502 and the passive brake device 508 in FIG. 28 when the driving part 512 is located at the releasing position. The engaging rod 526 of the second engaging part 520 is also separate from the hub 60 of the first wheel set 16. That is, when the driving part 512 is located at the releasing position as shown in FIG. 29, the first wheel set 16 and the second wheel set 18 can rotate relative to the first wheel base 502 and the second wheel base 504, respectively.

Figure 31:
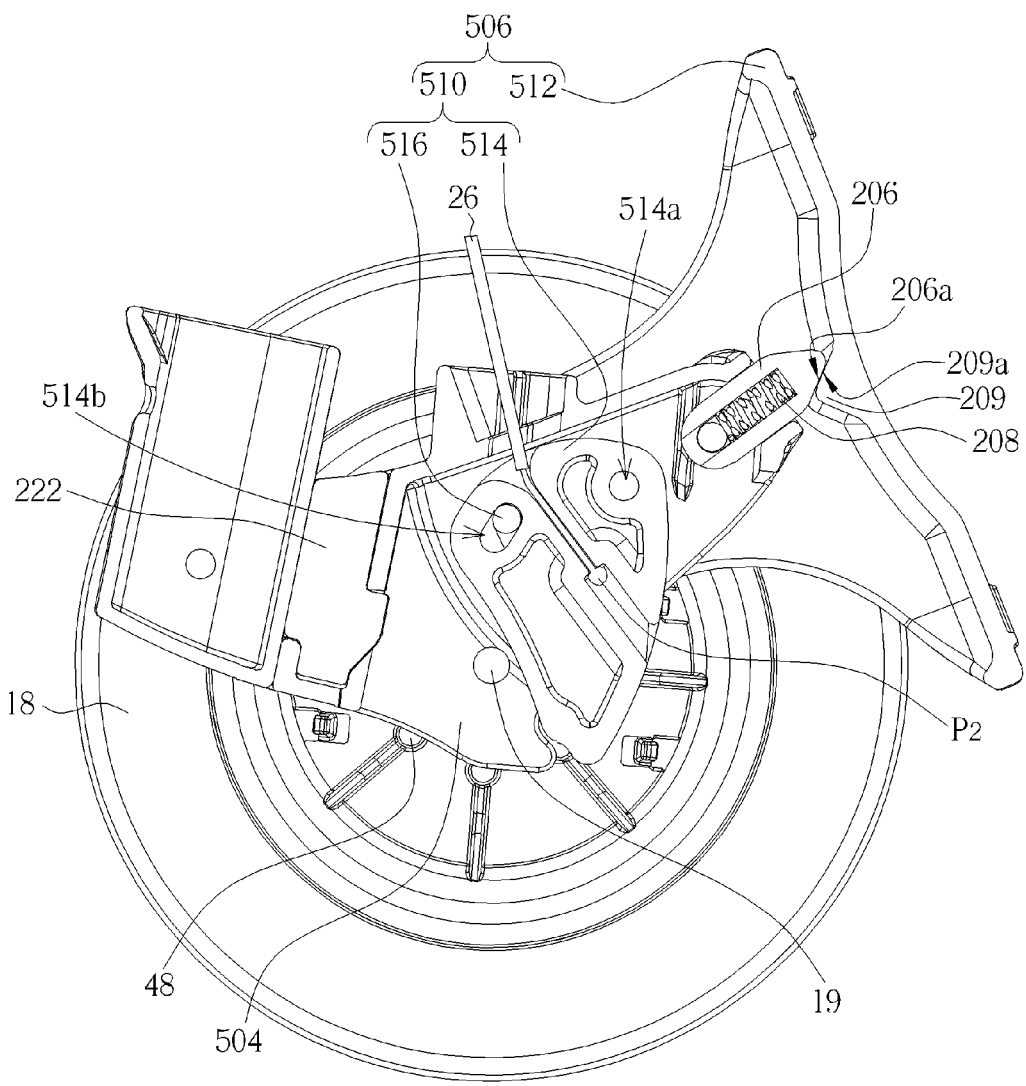
FIG. 31 is an interior diagram of the second wheel base and the active brake device in FIG. 29 when the driving part is located at a locking position.
Figure 32:
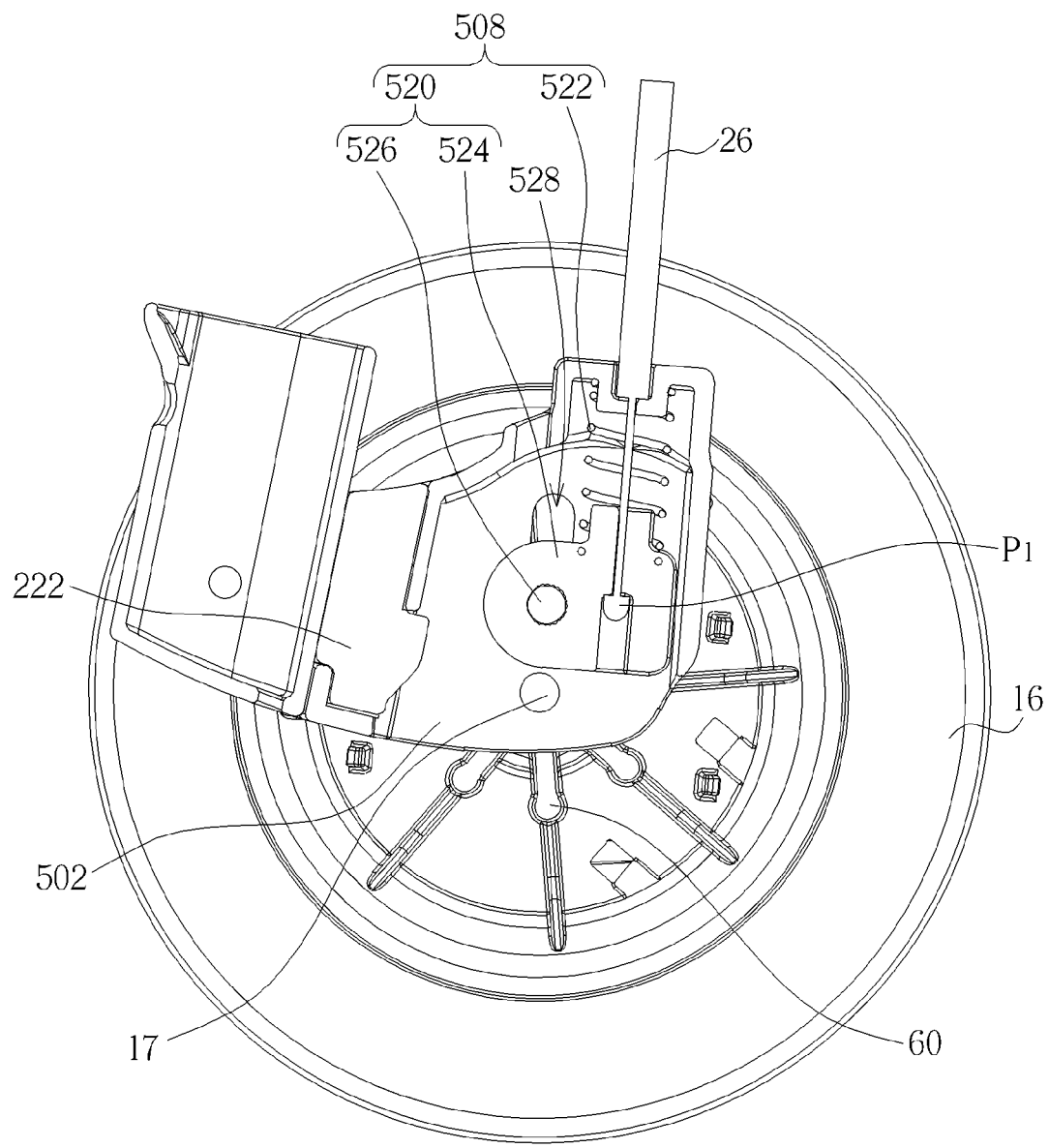
FIG. 32 is an interior diagram of the first wheel base and the passive brake device in FIG. 30 when the driving part is located at the locking position.

Next, please refer to FIG. 31 and FIG. 32. FIG. 31 is an interior diagram of the second wheel base 504 and the active brake device 506 in FIG. 29 when the driving part 512 is located at the locking position. FIG. 32 is an interior diagram of the first wheel base 502 and the passive brake device 508 in FIG. 30 when the driving part 512 is located at the locking position. If the user wants to operate the active brake device 512 to brake the stroller 10, the user just needs to push the driving part 512 to rotate from the releasing position as shown in FIG. 29 to the locking position as shown in FIG. 31 relative to the second wheel base 504. At this time, with rotation of the driving part 512, the connecting rod 516 may move the engaging block 514 along the slot hole 518 to be engaged with the hub 48 of the second wheel set 18, so as to make the second wheel set 18 incapable of rotating relative to second wheel base 504. On the other hand, since the second end $P_2$ of the linkage part 26 is no longer pulled by the engaging block 514, the sliding block 524 can move from a position as shown in FIG. 30 to a position as shown in FIG. 32 relative to the first wheel base 502 by elastic force provided from the spring 522, so as to move the engaging rod 526 along the slot hole 528 to be engaged with the hub 60 of the first wheel set 16. In brief, when the user pushes the driving part 512 to rotate to the locking position as shown in FIG. 31, the stroller 10 can constrain rotation of the first wheel set 16 and the second wheel set 18 via linkage of the active brake device 506, the linkage part 26 and the passive brake device 508.

As for the structural relationship of the limiting part 206 and the protruding structure 209 in the sixth embodiment, it is opposite to that in the third embodiment. That is, when the driving part 512 is located at the releasing position, the fourth surface 206b of the limiting part 206 may abut against the second surface 209b of the protruding structure 209 (as shown in FIG. 29) so that the driving part 512 can be positioned at the releasing position steadily. When the driving part 512 is located at locking position, the third surface 206a of the limiting part 206 may abut against the first surface 209a of the protruding structure 209 (as shown in FIG. 31) so that the driving part 512 can be positioned at the locking position steadily. As for the detailed description for the limiting part 206 and the protruding structure 209 in the sixth embodiment, it is omitted herein since it is similar to that mentioned in the third embodiment.

If the user wants to release the first engaging part 510 and the second engaging part 520, the user just needs to push the driving part 512 to the releasing position as shown in FIG. 29. At this time, the connecting rod 516 may push the engaging block 514 along the slot hole 518 of the second wheel base 504 with rotation of the driving part 512 to be separate from the hub 48 of the second wheel set 18. Simultaneously, the engaging rod 526 of the second engaging part 520 may also be separate from the hub 60 of the first wheel set 16. In such a manner, the first wheel set 16 and the second wheel set 18 is capable of rotating relative to the first wheel base 502 and the second wheel base 504, respectively.

It should be mentioned that disposal of the shock-absorbing blocks mentioned in the third embodiment and disposal of elastic sheets and the shock-absorbing springs mentioned in the fourth embodiment and the fifth embodiment can be applied to each other mutually. Furthermore, since the structural designs of the active brake device and the passive brake device and the related linkage with the linkage part mentioned in the fourth embodiment is similar to those mentioned in the fifth embodiment, disposal of the passive brake device in the fourth embodiment and that in the fifth embodiment are also applied to each other mutually.

In summary, compared with the prior art utilizing brake mechanisms disposed on a left wheel and a right wheel respectively to brake a stroller, the present invention utilizes linkage of an active brake device, a passive brake device, and a linkage part instead to achieve the purpose of braking wheels of a stroller simultaneously. In such a manner, the present invention may not only increase the operating convenience of the stroller and simplify the structural design of the brake mechanism via the said linkage design, but also allow a user to brake the left wheel and the right wheel of the stroller quickly in an emergency situation so as to prevent the stroller from turnover and slipping. Thus, safety of the baby sitting therein is further ensured. Furthermore, since either or both the engaging components of the active brake device and the passive brake device mentioned in the aforementioned embodiments are engaged with each other in a rotating manner, the brake mechanism provided by the present invention is safer, simpler, and more durable than a conventional brake mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brake mechanism for a stroller, the stroller comprising two feet disposed at two sides of the stroller respectively, a first wheel set, and a second wheel set, the brake mechanism comprising:
   a first wheel base and a second wheel base installed on the two feet respectively, the first wheel set and the second wheel set being pivotally connected to the first wheel base and the second wheel base respectively;
   a linkage part having a first end and a second end;
   a passive brake device movably connected to the first wheel base and connected to the first end of the linkage part; and
   an active brake device disposed on the second wheel base and connected to the second end of the linkage part, the active brake device comprising:
      a first engaging part movably disposed on the second wheel base and comprising a sliding block and an engaging rod, the second end of the linkage part being connected to the sliding block, the engaging rod passing through the sliding block; and
      a driving part connected to the first engaging part and pivotally connected to the second wheel base, the driving part being used for driving the first engaging part so as to move the passive brake device relative to the first wheel base via the linkage part when the driving part rotates between a locking position and a releasing position relative to the second wheel base, the engaging rod being disposed through a slot hole of the second wheel base and a guiding slot of the driving part, the guiding slot of the driving part being used for guiding the engaging rod along the slot hole to be engaged with a hub of the second wheel set and driving the sliding block to pull the linkage part so as to drive the passive brake device to be engaged with the first wheel set when the driving part rotates to the locking position relative to the second wheel base;
   wherein when the driving part is located at the locking position, the passive brake device and the first engaging part of the active brake device may constrain rotation of the first wheel set and the second wheel set, respectively.

2. The brake mechanism of claim 1, wherein the guiding slot comprises a guiding portion and an engaging portion, the guiding portion communicates with the engaging portion, and the engaging rod is located at the engaging portion when the driving part is located at the locking position.

3. The brake mechanism of claim 1 further comprising a shock-absorbing device disposed inside the first wheel base.

4. A stroller comprising:
   a stroller body;
   two feet disposed at two sides of the stroller body, respectively;
   a first wheel set and a second wheel set; and
   a brake mechanism comprising:
      a first wheel base and a second wheel base installed on the two feet, respectively, the first wheel set and the second wheel set being pivotally connected to the first wheel base and the second wheel base, respectively;
      a linkage part having a first end and a second end;
      a passive brake device movably connected to the first wheel base and connected to the first end of the linkage part; and
      an active brake device disposed on the second wheel base and connected to the second end of the linkage part, the active brake device comprising:
         a first engaging part movably disposed on the second wheel base and comprising a sliding block and an engaging rod, the second end of the linkage part being connected to the sliding block, the engaging rod passing through the sliding block; and
         a driving part connected to the first engaging part and pivotally connected to the second wheel base, the driving part being used for driving the first engaging part so as to move the passive brake device relative to the first wheel base via the linkage part when the driving part rotates between a locking position and a releasing position relative to the second wheel base, the first engaging part being disposed through a slot hole of the second wheel base and a guiding slot of the driving part, the guiding slot of the driving part being used for guiding the engaging rod along the slot hole to be engaged with a hub of the second wheel set and driving the sliding block to pull the linkage part so as to drive the passive brake device to be engaged with the first wheel set when the driving part rotates to the locking position relative to the second wheel base;
      wherein when the driving part is located at the locking position, the passive brake device and the first engaging part of the active brake device may constrain rotation of the first wheel set and the second wheel set, respectively.

5. The stroller of claim 4, wherein the passive brake device comprises a second engaging part and a spring, the second engaging part comprises a pivot portion, a connecting portion, and an engaging portion, the pivot portion is pivotally connected to the first wheel base, the first end of the linkage part is connected to the connecting portion, the spring of the passive brake device envelops the first end of the linkage part and abuts against the first wheel base and the connecting portion, the spring of the passive brake device is used for pushing the connecting portion so as to make the engaging portion separate from a hub of the first wheel set when the driving part rotates to the releasing position relative to the second wheel base.

6. The stroller of claim 5, wherein the spring of the passive brake device abuts against the first wheel base and the connecting portion of the second engaging part in a compressed state, and is used for pressing the driving part via the linkage part so as to position the driving part on the second wheel base.

7. The stroller of claim 4, wherein the guiding slot comprises a guiding portion and an engaging portion, the guiding portion communicates with the engaging portion, and the engaging rod is located at the engaging portion when the driving part is located at the locking position.

8. The stroller of claim 4, wherein the brake mechanism further comprises a shock-absorbing device disposed inside the first wheel base.

* * * * *